United States Patent
Mueller et al.

(10) Patent No.: US 8,167,196 B2
(45) Date of Patent: *May 1, 2012

(54) EXPANDED MASS DATA SETS FOR ELECTRONIC CHECK PROCESSING

(75) Inventors: Randall Lee Mueller, Kansas City, MO (US); Thomas Edwin Schaadt, Westerville, OH (US); V. Srinivas Nori, Norcross, GA (US); Steven Q. Purser, Plano, TX (US); Pablo Gonzalez, Forney, TX (US); Bruce D. Herring, Smithville, MO (US); James A. Blake, Brunswick, OH (US)

(73) Assignees: Federal Reserve Bank of Atlanta, Atlanta, GA (US); Federal Reserve Bank of Cleveland, Cleveland, OH (US); Federal Reserve Bank of Dallas, Dallas, TX (US); Federal Reserve Bank of Kansas City, Kansas City, MO (US)

( * ) Notice: Subject to any disclaimer, the term of this patent is extended or adjusted under 35 U.S.C. 154(b) by 391 days.

This patent is subject to a terminal disclaimer.

(21) Appl. No.: 12/479,219

(22) Filed: Jun. 5, 2009

(65) Prior Publication Data

US 2009/0236413 A1    Sep. 24, 2009

Related U.S. Application Data

(63) Continuation of application No. 11/362,343, filed on Feb. 22, 2006, now Pat. No. 7,594,600.

(60) Provisional application No. 60/657,142, filed on Feb. 28, 2005.

(51) Int. Cl.
*G06K 5/00* (2006.01)

(52) U.S. Cl. ......................................... 235/375; 235/380
(58) Field of Classification Search .................. 235/375, 235/379, 380, 382, 441, 449; 705/37, 35; 382/112, 139, 137
See application file for complete search history.

(56) References Cited

U.S. PATENT DOCUMENTS

| | | |
|---|---|---|
| 4,264,808 A | 4/1981 | Owens et al. |
| 4,270,042 A | 5/1981 | Case |
| 4,523,330 A | 6/1985 | Cain |

(Continued)

OTHER PUBLICATIONS

"Vision, Strategy & Approach to Image Quality & Archive Integrity, A Review of Carreker's Current Initiatives Towards Image Quality Detection & Resolution", Federal Reserve System, Aug. 19, 2003, Copyright © 2003 Carreker Corporation, pp. 1-43.

(Continued)

*Primary Examiner* — Thien M Le
(74) *Attorney, Agent, or Firm* — King & Spalding

(57) ABSTRACT

Accommodating the data needed to process checks for payment under the Check Clearing for the $21^{st}$ Century Act by using expanded fields of a financial data file. The financial data file can comprise the complete, original MICR data from an original or substitute paper check. The financial data file can comprise truncated data in conventional fields F1-F7 and untruncated data in expanded fields F10-F11. The financial data file further can comprise a result from an image quality analysis performed on an electronic image of the check. The untruncated MICR data and the electronic check image can be used to correct errors in the financial data file and to present the check for payment via a substitute check or an electronic image cash letter. The truncated MICR data can be used to electronically process the check via conventional means.

49 Claims, 16 Drawing Sheets

U.S. PATENT DOCUMENTS

| | | | |
|---|---|---|---|
| 4,694,397 A | 9/1987 | Grant et al. | |
| 4,823,264 A | 4/1989 | Deming | |
| 4,948,174 A | 8/1990 | Thomson et al. | |
| 4,974,878 A | 12/1990 | Josephson | |
| 5,038,283 A | 8/1991 | Caveney | |
| 5,120,944 A | 6/1992 | Kern et al. | |
| 5,121,945 A | 6/1992 | Thomson et al. | |
| 5,187,750 A | 2/1993 | Behera | |
| 5,198,975 A | 3/1993 | Baker et al. | |
| 5,237,159 A | 8/1993 | Stephens et al. | |
| 5,265,007 A | 11/1993 | Barnhard et al. | |
| 5,373,550 A | 12/1994 | Campbell et al. | |
| 5,412,190 A | 5/1995 | Josephson et al. | |
| 5,583,759 A | 12/1996 | Geer | |
| 5,600,732 A | 2/1997 | Ott et al. | |
| 5,668,897 A | 9/1997 | Stolfo | |
| 5,677,955 A | 10/1997 | Doggett et al. | |
| 5,680,611 A | 10/1997 | Rail et al. | |
| 5,687,250 A | 11/1997 | Curley et al. | |
| 5,689,579 A | 11/1997 | Josephson | |
| 5,692,065 A | 11/1997 | Prakash et al. | |
| 5,754,674 A | 5/1998 | Ott et al. | |
| 5,783,808 A | 7/1998 | Josephson | |
| 5,790,717 A | 8/1998 | Judd | |
| 5,819,236 A | 10/1998 | Josephson | |
| 5,832,140 A | 11/1998 | Stapleton et al. | |
| 5,930,778 A | 7/1999 | Geer | |
| 5,937,084 A | 8/1999 | Crabtree et al. | |
| 5,940,524 A | 8/1999 | Murayama et al. | |
| 5,963,654 A | 10/1999 | Prakash et al. | |
| 6,019,282 A | 2/2000 | Thompson et al. | |
| 6,097,834 A | 8/2000 | Krouse et al. | |
| 6,115,509 A | 9/2000 | Yeskel | |
| 6,170,744 B1 | 1/2001 | Lee et al. | |
| 6,236,756 B1 | 5/2001 | Kimura et al. | |
| 6,243,689 B1 | 6/2001 | Norton | |
| 6,351,546 B1 | 2/2002 | Murayama et al. | |
| 6,351,553 B1 | 2/2002 | Hayosh | |
| 6,450,403 B1 | 9/2002 | Martens et al. | |
| 6,571,000 B1 | 5/2003 | Rasmussen et al. | |
| 6,577,761 B1 | 6/2003 | Kanno et al. | |
| 6,585,775 B1 | 7/2003 | Cosentino et al. | |
| 6,658,139 B1 | 12/2003 | Cookingham et al. | |
| 6,717,592 B2 | 4/2004 | Gusler et al. | |
| 6,792,133 B2 | 9/2004 | Ott et al. | |
| 6,850,950 B1 | 2/2005 | Clarke et al. | |
| 6,854,656 B2 | 2/2005 | Matsumori | |
| 6,912,297 B2 | 6/2005 | Scott et al. | |
| 6,963,885 B2 | 11/2005 | Calkins et al. | |
| 6,996,263 B2 | 2/2006 | Jones et al. | |
| 7,000,828 B2 | 2/2006 | Jones | |
| 7,066,668 B2 | 6/2006 | Sandison et al. | |
| 7,066,669 B2 | 6/2006 | Lugg | |
| 7,082,216 B2 | 7/2006 | Jones et al. | |
| 7,092,560 B2 | 8/2006 | Jones et al. | |
| 7,099,845 B2 | 8/2006 | Higgins et al. | |
| 7,120,606 B1 | 10/2006 | Ranzini et al. | |
| 7,167,580 B2 | 1/2007 | Klein et al. | |
| 7,283,656 B2 | 10/2007 | Blake et al. | |
| 7,386,511 B2* | 6/2008 | Buchanan et al. | 705/45 |
| 7,526,117 B2* | 4/2009 | Foth et al. | 382/137 |
| 7,539,646 B2 | 5/2009 | Gilder et al. | |
| 7,546,275 B1 | 6/2009 | Herzberg et al. | |
| 7,594,600 B2* | 9/2009 | Mueller et al. | 235/375 |
| 7,950,698 B2* | 5/2011 | Popadic et al. | 283/70 |
| 2001/0039534 A1 | 11/2001 | Keene | |
| 2001/0051921 A1 | 12/2001 | Garner et al. | |
| 2002/0150279 A1 | 10/2002 | Scott et al. | |
| 2003/0158811 A1 | 8/2003 | Sanders et al. | |
| 2003/0202690 A1 | 10/2003 | Jones et al. | |
| 2003/0208421 A1 | 11/2003 | Vicknair | |
| 2003/0225704 A1 | 12/2003 | Park et al. | |
| 2004/0030621 A1 | 2/2004 | Cobb | |
| 2004/0068464 A1 | 4/2004 | Buchanan et al. | |
| 2004/0109596 A1 | 6/2004 | Doran | |
| 2004/0133516 A1 | 7/2004 | Buchanan et al. | |
| 2004/0143621 A1 | 7/2004 | Fredrickson et al. | |
| 2004/0148235 A1 | 7/2004 | Craig et al. | |
| 2004/0181485 A1 | 9/2004 | Finch | |
| 2004/0218203 A1 | 11/2004 | Mastie et al. | |
| 2004/0236688 A1 | 11/2004 | Bozeman | |
| 2005/0018896 A1 | 1/2005 | Heit et al. | |
| 2005/0044043 A1 | 2/2005 | Gooding et al. | |
| 2005/0071283 A1 | 3/2005 | Randle et al. | |
| 2005/0080719 A1 | 4/2005 | Sellen et al. | |
| 2005/0080738 A1 | 4/2005 | Sellen et al. | |
| 2005/0086136 A1 | 4/2005 | Love et al. | |
| 2005/0097046 A1 | 5/2005 | Singfield | |
| 2005/0097050 A1 | 5/2005 | Orcutt | |
| 2005/0109833 A1 | 5/2005 | Page | |
| 2005/0129300 A1 | 6/2005 | Sandison et al. | |
| 2005/0131820 A1* | 6/2005 | Rodriguez et al. | 705/42 |
| 2005/0139670 A1 | 6/2005 | McGlamery | |
| 2005/0144131 A1 | 6/2005 | Aziz | |
| 2005/0171899 A1 | 8/2005 | Dunn et al. | |
| 2005/0175221 A1 | 8/2005 | Scott et al. | |
| 2005/0203857 A1 | 9/2005 | Friedman | |
| 2005/0211763 A1 | 9/2005 | Sgambati et al. | |
| 2005/0213805 A1 | 9/2005 | Blake et al. | |
| 2005/0220324 A1 | 10/2005 | Klein et al. | |
| 2005/0238252 A1 | 10/2005 | Prakash et al. | |
| 2005/0243378 A1 | 11/2005 | Klein et al. | |
| 2005/0243379 A1 | 11/2005 | Klein et al. | |
| 2005/0244035 A1 | 11/2005 | Klein et al. | |
| 2005/0252960 A1 | 11/2005 | Murata | |
| 2005/0256839 A1 | 11/2005 | Leong et al. | |
| 2005/0281448 A1 | 12/2005 | Lugg | |
| 2006/0006222 A1 | 1/2006 | Brey et al. | |
| 2006/0023930 A1 | 2/2006 | Patel et al. | |
| 2006/0045321 A1 | 3/2006 | Yu | |
| 2006/0045600 A1 | 3/2006 | Lugg | |
| 2006/0080245 A1 | 4/2006 | Bahl et al. | |
| 2006/0106717 A1 | 5/2006 | Randle et al. | |
| 2006/0112013 A1 | 5/2006 | Maloney | |
| 2006/0118613 A1 | 6/2006 | McMann et al. | |
| 2006/0133277 A1 | 6/2006 | Carozza | |
| 2006/0167784 A1 | 7/2006 | Hoffberg | |
| 2006/0182331 A1 | 8/2006 | Gilson et al. | |
| 2006/0182332 A1 | 8/2006 | Weber | |
| 2006/0184441 A1* | 8/2006 | Haschka et al. | 705/35 |
| 2006/0186194 A1* | 8/2006 | Richardson et al. | 235/379 |
| 2006/0188310 A1 | 8/2006 | Sandison et al. | |
| 2006/0188311 A1 | 8/2006 | Lugg | |
| 2006/0191998 A1 | 8/2006 | Mueller et al. | |
| 2006/0206427 A1 | 9/2006 | Love et al. | |
| 2006/0212391 A1 | 9/2006 | Norman et al. | |
| 2006/0229987 A1 | 10/2006 | Leekley | |
| 2006/0237526 A1 | 10/2006 | Mueller et al. | |
| 2006/0248009 A1 | 11/2006 | Hicks et al. | |
| 2006/0280354 A1 | 12/2006 | Murray | |
| 2007/0086642 A1* | 4/2007 | Foth et al. | 382/137 |
| 2007/0095888 A1 | 5/2007 | Mueller et al. | |
| 2007/0100672 A1 | 5/2007 | McBrida et al. | |
| 2007/0156438 A1 | 7/2007 | Popadic et al. | |
| 2007/0235518 A1 | 10/2007 | Mueller et al. | |
| 2007/0244782 A1 | 10/2007 | Chimento | |
| 2007/0288382 A1 | 12/2007 | Narayanan et al. | |
| 2008/0006687 A1 | 1/2008 | Mueller et al. | |
| 2008/0097899 A1 | 4/2008 | Jackson et al. | |
| 2008/0103790 A1 | 5/2008 | Abernathy et al. | |
| 2008/0159655 A1 | 7/2008 | Breeden et al. | |
| 2008/0162319 A1 | 7/2008 | Breeden et al. | |
| 2008/0162320 A1 | 7/2008 | Mueller et al. | |
| 2008/0162321 A1 | 7/2008 | Breeden et al. | |
| 2008/0162322 A1 | 7/2008 | Breeden et al. | |
| 2008/0247629 A1 | 10/2008 | Gilder et al. | |

OTHER PUBLICATIONS

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

Excerpt of Bank of America checking account statement, with personal information redacted, Aug. 2008.

Holcomb, Notice 04-57, Aug. 27, 2004, Federal Reserve Bank of Dallas, 6 pages.

Microsoft Computer Dictionary, Fifth Edition, Microsoft Press, Copyright 2002, p. 258, 3 pages.

"CONIX Systems Launches Dupe Detective: New Product Eliminates Cost and Liability of Processing Items Multiple Times", Business Wire, May 18, 2006, 3 pages.

"Alogent Offering Sierra Solution for Image Cash Letter Deposits: Image Cash Letter and Back Office Conversion Capabilities Optimized for Large Merchants and Correspondent Banks", Business Wire, Oct. 10, 2005, p. 1, 2 pages.

"Taking Control of Payment Duplication: An In-Depth Look at a Serious Challenge Created by Check 21", Conix Systems, Inc., White Papers, Sep. 8, 2006, Retrieved Feb. 3, 2009, http://www.conix.com/news/default.asp, 9 pages.

Greene, U.S. Appl. No. 11/482,379, Office Action, Sep. 30, 2009, 29 pages.

Greene, U.S. Appl. No. 11/482,379, Office Action, Jun. 10, 2009, 8 pages.

Greene, U.S. Appl. No. 11/482,379, Office Action, Sep. 29, 2008, 5 pages.

Labaze, U.S. Appl. No. 11/482,360, Office Action, Sep. 23, 2009, 8 pages.

Captovation Announces the Release of Check Capture 5.1; Newest Version of Check Imaging Software Includes Features to Facilitate Electronic Check Exchange and Presentment, Business Wire; New York, Aug. 10, 2006. p. 1, last accessed May 9, 2010, available online.

3.Next Stop: image exchange?, ABA Banking Journal (0194-5947), 2003. vol. 95, Issue 11, p. 10.

"All My Papers tm, Creating Editing and Using Image Cash Letter. X9.37 Files." http://replay.web.archive.org/20060519041745/http://www.ggx.com/solutions_7.htm> retrieved Apr. 26, 2011 (6 pages).

* cited by examiner

Cover Page

| | |
|---|---|
| Input File Name: | PBIK1.DAT2.PBS.R1110.N0003.D051212.T16542.dat.10000000047199.12 |
| Output File Name: | PBIK1.DAT2.PBS.R1110.N0003.D051212.T16542.dat.10000000047199.12done |
| Item Count: | 4546 ← 1005 |
| IRD Requester Name: | null |
| FED FED FED | |

TO:  DESTINATION ABA 102000199    (ANSI 8.3)
     DESTINATION NAME
     ADDRESS LINE 1   ← 1010
     ADDRESS LINE 2
     CITY, STATE AND ZIP CODE

BIN_____  SECTION :_____  COURIER :_____

---

INTENTIONALLY LEFT BLANK

Perforations

---

INTENTIONALLY LEFT BLANK

Fig. 10

BUNDLE SUMMARY A — RESTART PAGE NUMBER

FROM ABA (ANSI 9.4)  FWD/RET COLLECTION TYPE (ANSI 9.9)  CYCLE (ANSI 9.9)  BUNDLE CREATION DATE (ANSI 9.60)
FROM 1020000199    COLLECTION TYPE 02   CYCLE 5    MM/DD/YYYY   (PRINTED MM/DD/YYYY TIME 14:47) Page 1 of 3

| RT | Amount | ISN | RT | Amount | ISN | RT | Amount | ISN |
|---|---|---|---|---|---|---|---|---|
| 0021-2027 | 00000112.00 | 52962657 | 0021-2027 | 00000112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |

TO: BANK NAME                                    SECTION_____ BIN_____
    ADDRESS LINE 1
    ADDRESS LINE 2
    CITY, STATE AND ZIP CODE

BUNDLE ID (ANSI 9.7)       TO:  EP ABA (ANSI 8.3)       BUNDLE TOTAL AMOUNT (ANSI 27.4)
BUNDLE ID 428211900        TO:  101000048    FIRST   112.00    AMOUNT    1,079.10  ← 1110
         FIRST ITEM IN BUNDLE/LAST ITEM IN BUNDLE              ITEM COUNT (SUM OF ANSI 24.2)
                                          LAST    112.00    ITEMS    162  ← 1105

---

BUNDLE SUMMARY A

FROM 1020000199    COLLECTION TYPE 02   CYCLE 5    MM/DD/YYYY   (PRINTED MM/DD/YYYY TIME 14:47) Page 2 of 3

| RT | Amount | ISN | RT | Amount | ISN | RT | Amount | ISN |
|---|---|---|---|---|---|---|---|---|
| 0021-2027 | 00000112.00 | 52962657 | 0021-2027 | 00000112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |

TO: BANK NAME                                    SECTION_____ BIN_____
    ADDRESS LINE 1
    ADDRESS LINE 2
    CITY, STATE AND ZIP CODE

BUNDLE ID 428211900        TO:  101000048    FIRST   112.00    AMOUNT    1,079.10
                                          LAST    112.00    ITEMS    162

Perforations

---

BUNDLE SUMMARY A

FROM 1020000199    COLLECTION TYPE 02   CYCLE 5    MM/DD/YYYY   (PRINTED MM/DD/YYYY TIME 14:47) Page 3 of 3

| RT | Amount | ISN | RT | Amount | ISN | RT | Amount | ISN |
|---|---|---|---|---|---|---|---|---|
| 0021-2027 | 00000112.00 | 52962657 | 0021-2027 | 00000112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |

TO: BANK NAME                                    SECTION_____ BIN_____
    BANK ADDRESS
    CITY, STATE AND ZIP CODE

BUNDLE ID 428211900        TO:  101000048    FIRST   112.00    AMOUNT    1,079.10
                                          LAST    112.00    ITEMS    162

Fig. 11

CASH LETTER BUNDLE SUMMARY

FROM: 101000048 (ANSI 8.4)  PRINTED MM/DD/YYYY  14:49  PAGE X OF X
FRB KANSAS CITY  CYCLE 5 (ANSI 9.9)  CASH LETTER ID ( ANSI 8.10)

| BUNDLE ID (ANSI 9.7) | BUNDLE NO | ITEM COUNT (ANSI 24.2) | AMOUNT (ANSI 24.3) | BUNDLE ID (ANSI 9.7) | BUNDLE # | ITEM COUNT (ANSI 24.2) | AMOUNT (ANSI 24.3) |
|---|---|---|---|---|---|---|---|
| 0000123455 | 1 | 300 | 193456.00 | 0123123174 | 16 | 125 | 123123.56 |
| 0000123456 | 2 | 300 | 123456.00 | 0123123175 | 17 | 125 | 123123.56 |
| 0000123457 | 3 | 300 | 123456.00 | 0123123176 | 18 | 125 | 123123.56 |
| 0000123458 | 4 | 300 | 123456.00 | 0123123177 | 19 | 125 | 123123.56 |
| 0000123459 | 5 | 300 | 123456.00 | 0123123178 | 20 | 125 | 123123.56 |
| 0000123460 | 6 | 300 | 123456.00 | 0123123179 | 21 | 125 | 123123.56 |
| 0000123461 | 7 | 300 | 123456.00 | 0123123180 | 22 | 125 | 123123.56 |
| 0000123462 | 8 | 300 | 123456.00 | 0123123181 | 23 | 125 | 123123.56 |
| 0000123463 | 9 | 300 | 123456.00 | 0123123182 | 24 | 125 | 123123.56 |
| 0000123464 | 10 | 300 | 123456.00 | 0123123183 | 25 | 125 | 123123.56 |
| 0000123465 | 11 | 300 | 123456.00 | 0123123184 | 26 | 125 | 123123.56 |
| 0000123466 | 12 | 300 | 123456.00 | 0123123185 | 27 | 125 | 123123.56 |
| 0000123467 | 13 | 300 | 123456.00 | 0123123186 | 28 | 125 | 123123.56 |
| 0000123468 | 14 | 300 | 123456.00 | 0123123187 | 29 | 125 | 123123.56 |
| 0000123469 | 15 | 300 | 123456.00 | 0123123188 | 30 | 125 | 123123.56 |

- - - - - - - - - - - - - - - - - - - - - - - - - - - - - - - - - - - - - - - - - - - - - -

CASH LETTER BUNDLE SUMMARY

FROM: 101000048 (ANSI 8.4)  PRINTED MM/DD/YYYY  14:49  PAGE X OF X
FRB KANSAS CITY  CYCLE 5 (ANSI 9.9)  CASH LETTER ID ( ANSI 8.10)

| BUNDLE ID (ANSI 9.7) | BUNDLE NO | ITEM COUNT (ANSI 24.2) | AMOUNT (ANSI 24.3) | BUNDLE ID (ANSI 9.7) | BUNDLE # | ITEM COUNT (ANSI 24.2) | AMOUNT (ANSI 24.3) |
|---|---|---|---|---|---|---|---|
| 0000123470 | 31 | 300 | 123456.00 | | | | |
| 0000123471 | 32 | 300 | 123456.00 | | | | |
| 0000123472 | 33 | 300 | 123456.00 | | | | |
| 0000123473 | 34 | 300 | 123456.00 | | | | |
| 0000123455 | 35 | 300 | 193456.00 | | | | |
| 0000123456 | 36 | 300 | 123456.00 | | | | |
| 0000123457 | 37 | 300 | 500999.99 | | | | |

(Perforations)

- - - - - - - - - - - - - - - - - - - - - - - - - - - - - - - - - - - - - - - - - - - - - -

CASH LETTER BUNDLE SUMMARY

******* COLLECTION TYPE - 01 ******

BIN_____  SECTION :_____  COURIER :_____

FROM: 101000048
      FRB KANSAS CITY

TO: DESTINATION ABA 102000199  (ANSI 8.3)
    DESTINATION NAME
    ADDRESS LINE 1
    ADDRESS LINE 2
    CITY, STATE AND ZIP CODE

|  |  |  |  |
|---|---|---|---|
| | | 1ST BUNDLE | 193,456.00 |
| | | LAST BUNDLE | 500,999.99 |
| CASH LETTER TOTALS | | CYCLE DATE | MM/DD/YY (ANSI 8.5) |
| ITEMS | 4546 ← 1305 | CASH LETTER ID | 12345678 (ANSI 8.10) |
| AMOUNT | 1,777,456.99 ← 1310 | FED WORK TYPE | (ANSI 8.13) |
| BUNDLES | 46 | | |

Fig. 13

RESTART PAGE NUMBER

**\* \* \* \* \* \* \* \* EXCEPTION REPORT PAGE \* \* \* \* \* \* \* \***
IRD Print Summary                                      PAGE X OF X
Failed IRD Print Listing

| RT | Sequence | Amount | Bundle ID | Reason |
|---|---|---|---|---|
| 241076770 | 007858551424 | 100.00 | 4242119000 | Digit Error in Required Field |
| 451478524 | 008348525452 | 4432.00 | 5845844581 | No Image Data |
| 467854545 | 014525841258 | 3110.00 | 5845844581 | No Image Data |

----

INTENTIONALLY LEFT BLANK

Perforations

----

INTENTIONALLY LEFT BLANK

Fig. 14

EXPANDED MASS DATA SETS FOR ELECTRONIC CHECK PROCESSING

RELATED PATENT APPLICATIONS

This patent application is a continuation of U.S. patent application Ser. No. 11/362,343, entitled "Expanded Mass Data Sets for Electronic Check Processing," filed Feb. 22, 2006, which claims priority under 35 U.S.C. §119 to U.S. Provisional Patent Application No. 60/657,142, entitled "Check Processing Using Substitute Check Images," filed Feb. 28, 2005. This patent application also is related to U.S. patent application Ser. No. 11/362,344, entitled "Cash Letter Print Streams with Audit Data," filed Feb. 22, 2006. The complete disclosure of the above-identified priority and related applications is hereby fully incorporated herein by reference.

TECHNICAL FIELD

The invention relates generally to check processing and more particularly to accommodating the data needed to process checks for payment under the Check Clearing for the 21$^{st}$ Century Act by using expanded fields of a financial data file.

BACKGROUND

Magnetic Ink Character Recognition ("MICR") is an optical character recognition technology that banks use in processing checks. MICR data is printed in magnetic ink at the bottom of each paper check. For example, the MICR data can include the payor bank's routing transit number, the check writer's (check maker's or drawer's) account number, and a check number. A bank can electronically capture MICR data from a check using a MICR reader, which can read the data printed in magnetic ink on the check. The bank can use the electronic MICR data to settle the check between an account of the depositing institution (referred to herein as "payee") and an account of the receiving institution (referred to herein as "payor"). The term "bank" is generally used herein to refer to any party performing conventional or electronic check processing at any stage, including depositing and receiving institutions, their non-bank subsidiaries and affiliates, and any non-bank third party agents that provide processing services to banks.

In processing a check, a bank can store captured MICR data and other relevant data (collectively referred to herein as "financial data") in various fields of a financial data file for further check processing. The financial data can comprise information incidental to the check processing, such as a unique item sequence number, a check processing site identifier, a processing date, a check amount, and a routing transit number of the depositing institution. Capture software of the MICR reader can capture and/or generate such incidental data upon MICR data capture. As used herein, the term "financial data file" is generally used to refer to an electronic file that complies with the American National Standards Institute Specifications for Electronic Exchange of Check and Image Data (ANSI X9.37/X9.100), or other appropriate industry standards, as may change from time to time.

The bank can store the financial data in seven data fields, labeled F1-F7. The data stored in the financial data file can comprise the check amount stored in field F1, process control data stored in field F2, an account number stored in field F3, a check number stored in field F4, a routing transit number stored in field F5, an external processing code stored in field F6, and "auxiliary on us" data stored in field F7. Fields F2-F4 are collectively referred to herein as the "on us field." The data in the on us field is referred to herein as "on us data."

Conventionally, each field is respectively designed to accommodate a set number of characters without extraneous information such as dashes. Accordingly, prior to storing the financial data in the respective fields of the financial data file, the bank truncates all extraneous information and all data beyond the allowed number of characters in each field. The bank typically truncates the data in fields F2, F3, F4, and F7.

In addition to capturing and storing financial data, the bank also can capture electronic images of the front and back of each check via an image capturing device such as a scanner or a camera. The images can be used for various services in check processing. For example, by agreement, a bank might accept an image of a check for presentment or other purposes, instead of the actual paper document. The check images and associated data in fields F1-F7 provide sufficient information for those banks operating under the agreement to process a check for payment.

Effective Oct. 28, 2004, the Check Clearing for the 21st Century Act ("the Act") improves the ability of banks to use electronic images of paper checks by, for example, submitting those images, along with associated financial information, for electronic processing. The electronic images and financial data can be used to create a paper copy or "substitute" of the original check. Under the Act, a paper "substitute check" meeting specified requirements is a legal equivalent of an original paper check, and a receiving institution is required to accept the substitute check for payment. Under the Act, the substitute check must be essentially an exact copy of the original paper check. In particular, the substitute check must include an exact copy of all of the MICR data provided on the paper check and all endorsements.

Because banks conventionally have truncated the MICR data during check processing, they have been unable to produce a substitute check that comprises all of the MICR data provided on the original paper check. Thus, a need exists in the art for a system and method of processing checks, whereby banks can generate substitute checks that comply with the requirements of the Act (herein including applicable related regulations and industry standards). Specifically, a need exists in the art for capturing the complete MICR data for future use in creating a substitute check that meets the requirements of the Act. Additionally, a need exists in the art for integrating the capture of complete MICR data with conventional check processing methods to avoid a complete redesign of conventional systems.

SUMMARY

The invention provides systems and methods for processing checks under the Act. Specifically, the invention provides systems and methods for accommodating the complete data needed to process a substitute check for payment under the Act. By using expanded fields (also referred to herein as "expanded mass data sets") of a financial data file, banks can produce substitute checks and image cash letters ("ICLs") that include exact copies of all of the MICR data provided on corresponding, original paper checks. The banks also can use the expanded fields of the financial data file to more accurately and completely correct errors in the financial data file and to store information related to the quality of a captured electronic image of the paper check.

In one aspect of the invention, a sorter or data capture module of a bank, can identify MICR data and other relevant data (collectively referred to herein as "financial data") related to a paper check. The bank can be a depositing institution, a capture site, or a check processing site, for example. For example, the bank can identify the MICR data by reading the MICR data from the check via a MICR reader. Additionally, the bank can identify the other financial data relevant to processing of the check.

The financial data can comprise "on us" data and "auxiliary on us" data. The "on us" data can comprise process control data, account number data, and/or check number data. The "auxiliary on us" data can comprise information that can be used to uniquely identify a check. For example, the auxiliary on us data can comprise a serial number or other unique set of numbers, letters, and/or characters.

The data capture module of the bank can parse the "on us" data from the identified financial data and can store the parsed "on us" data in a first data field of a financial data file. For example, the data capture module can store the "on us" data in field F10 of the financial data file. The data capture module can further parse the "auxiliary on us" data from the identified financial data and can store the parsed "auxiliary on us" data in a second data field of the financial data file. For example, the data capture module can store the "auxiliary on us" data in field F11 of the financial data file. Thus, the first and second data fields can respectively comprise exact copies of the "on us" data and the "auxiliary on us" data from the original paper check, including any corresponding dashes or other extraneous characters, if present.

The data capture module also can truncate the "auxiliary on us" data and can store the truncated "auxiliary on us" data in a third data field of the financial data file. For example, the data capture module can truncate the "auxiliary on us" data to remove extraneous information and/or data beyond an allowed number of characters in the third data field. Then, the data capture module can store the truncated "auxiliary on us" data in field F7 of the financial data file. Similarly, the data capture module can truncate the "on us" data and store the truncated "on us" data in a fourth data field of the financial data file. For example, the data capture module can store the truncated "on us" data in field F2, F3, or F4 of the financial data file.

Depending on the contents of the "on us" data, the data capture module can store portions of the "on us" data in different data fields of the financial data file. For example, where the "on us" data comprises process control data and account number data, the data capture module can store the process control data in field F2 of the financial data file and the account number data in field F3 of the financial data file. The financial data can further comprise amount data, routing transit number data, and an external processing code, which the data capture module can store in fifth, sixth, and seventh fields of the financial data file. For example, the data capture module can store the amount data, the routing transit number data, and the external processing code in fields F1, F5, and F6, respectively, of the financial data file. Thus, the third, fourth, fifth, sixth, and seventh fields of the financial data file can comprise the data conventionally stored in fields F1-F7 of the financial data file. In addition to the processing systems and methods described herein, such data can be used to process the check for payment via conventional processing means.

In addition to the captured financial data, the sorter of the bank can capture an electronic image of the check via an image capturing device. For example, the image capturing device can comprise a scanner or a camera. The data capture module of the bank can associate the electronic image of the check with the check's financial data file for further processing. Additionally, the data capture module can read a result of an image quality analysis performed on the electronic image of the check and can store the result in a field of the financial data file. For example, the result of the image quality analysis can indicate whether the electronic image is suitable for its intended purpose.

A reject/repair module of the bank can use the electronic image of the check and the financial data file to correct detected errors in the financial data file. Conventionally, if an error is detected, then the reject/repair module presents financial data from conventional (truncated) fields F1-F7 to an operator for correction. The electronic image of the check also may be presented. Without major modifications to existing reject/repair systems, the reject/repair module can present the untruncated data stored in the first and second fields of the financial data file in place of the truncated data in the conventional data fields. Thus, the operator can view and correct errors based on the entire, untruncated financial data.

A presentment module of the bank can further use the electronic image of the check and the financial data file to present the check to a receiving institution for payment. For example, the presentment module can create a substitute check and/or an electronic ICL based on the electronic image and the financial data in the financial data file. By using the untruncated financial data in the financial data file, the presentment module can create a substitute check that comprises all of the MICR data from the original paper check, thus complying with the requirements of the Act. The bank can present the created substitute check via electronic or paper means. For example, the bank can electronically transmit a substitute check file comprising an electronic version of a substitute check to the receiving institution, which can print the substitute check. The bank can also electronically transmit an ICL to the receiving institution, which can use the ICL to print the substitute check. Alternatively, the bank can print the substitute check locally or remotely for delivery to the receiving institution. For example, the bank can generate, and transmit to the receiving institution, a print stream by which the receiving institution can print the substitute check.

These and other aspects, objects, features, and advantages of the invention will become apparent to those skilled in the art upon consideration of the following detailed description of illustrated exemplary embodiments, which include the best mode of carrying out the invention as presently perceived.

BRIEF DESCRIPTION OF THE DRAWINGS

FIG. 10 is a block diagram depicting a cover page printed from a print stream generated in accordance with an exemplary embodiment of the invention.

FIG. 11 is a block diagram depicting a bundle summary page printed from a print stream generated in accordance with an exemplary embodiment of the invention.

FIG. 13 is a block diagram depicting a cash letter bundle summary page printed from a print stream generated in accordance with an exemplary embodiment of the invention.

FIG. 14 is a block diagram depicting an exception report page printed from a print stream generated in accordance with an exemplary embodiment of the invention.

DETAILED DESCRIPTION OF EXEMPLARY EMBODIMENTS

Figure 1:
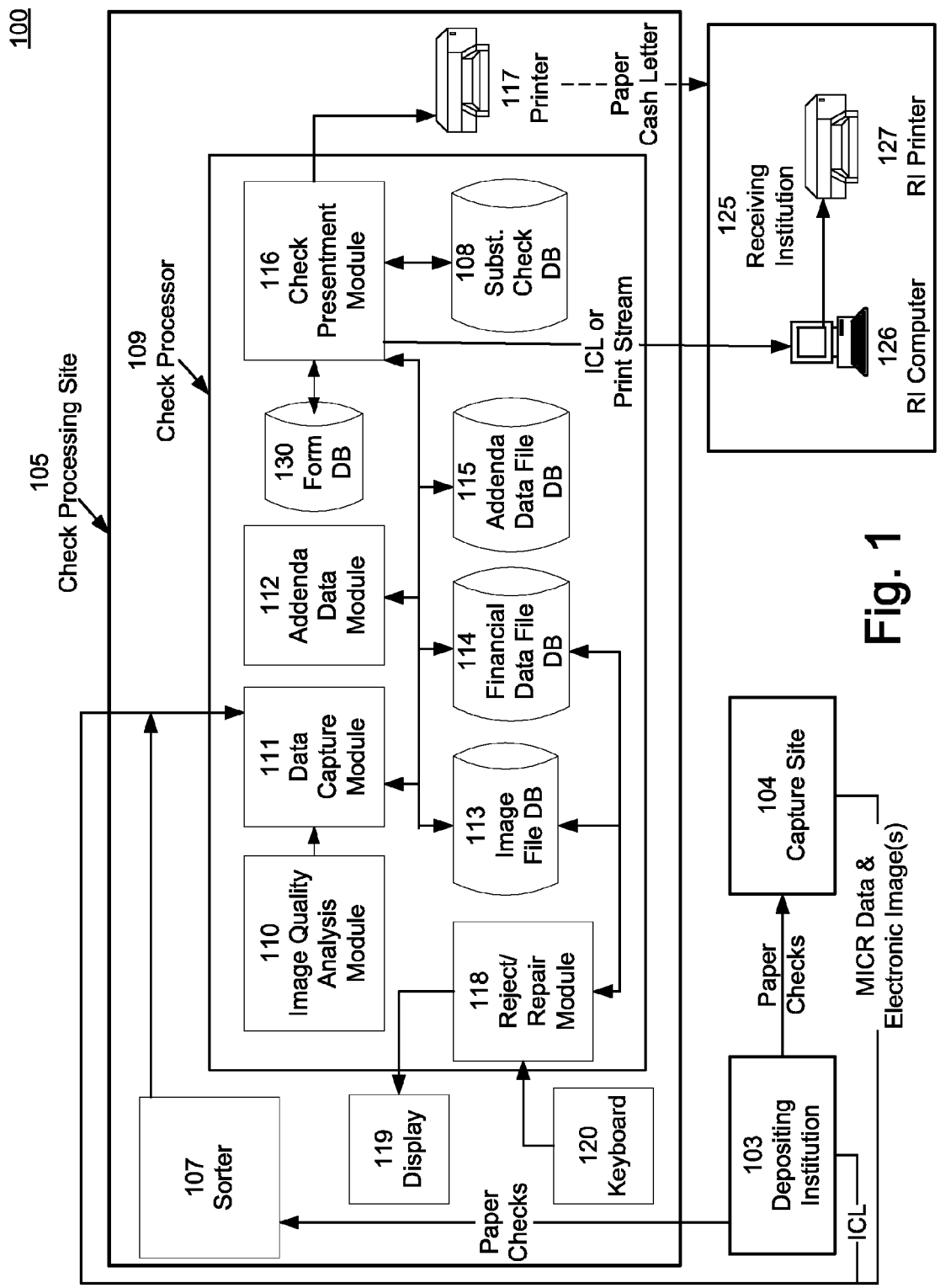
FIG. 1 is a block diagram depicting a system for processing checks using expanded mass data sets of a financial data file, according to an exemplary embodiment of the invention.

The invention is directed to systems and methods for processing checks under the Check Processing Under the Check Clearing For The $21^{st}$ Century Act ("the Act"). In particular, the invention is directed to producing substitute checks and electronic image cash letters ("ICLs") that include exact copies of all of the MICR data provided on corresponding, original paper checks.

In accordance with an exemplary embodiment of the invention, expanded data fields (also referred to herein as "expanded mass data sets") can accommodate the data needed to produce a substitute check meeting the requirements under the Act. A check's financial data file can comprise conventional, truncated fields F1-F7 as well as expanded fields, such as fields F10-F11. Fields F10 and F11 can include untruncated, original financial data related to the check. For example, field F10 can comprise, in untruncated form, the information typically provided in truncated form in the on us field, fields F2, F3, and F4. In addition, field F11 can comprise, in untruncated form, the information typically provided in truncated form in the auxiliary on us field, field F7. The untruncated data can include all characters from the original paper check, including special symbols, such as dashes and field delimiters or other items. Accordingly, the entire, original MICR data from the original paper check can be stored in the fields of the financial data file. With such data, a substitute check comprising the complete information necessary to meet the standards of the Act can be produced.

In accordance with another exemplary embodiment of the invention, the financial data file can include an additional data field, such as field F12, which can store information related to a quality of a corresponding check image. The data from field F12 can be used to determine if the check image is suitable for its intended purpose. For example, the data from field F12 can indicate whether the check image is suitable for creation of a substitute check. The data can further provide a reason for an image quality analysis result. In addition, an indicator can be stored in field 12 to indicate whether the image(s) corresponding to the data in field F12 has(have) corresponding addenda data.

In accordance with yet another exemplary embodiment of the invention, a reject/repair system and method can allow correcting errors detected in the financial data file and/or in the corresponding check image during check processing. Correction of the errors can include comparing the check image to the complete financial data provided in the expanded data fields. Use of the expanded data field data allows for a more accurate and complete comparison.

The invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 2:
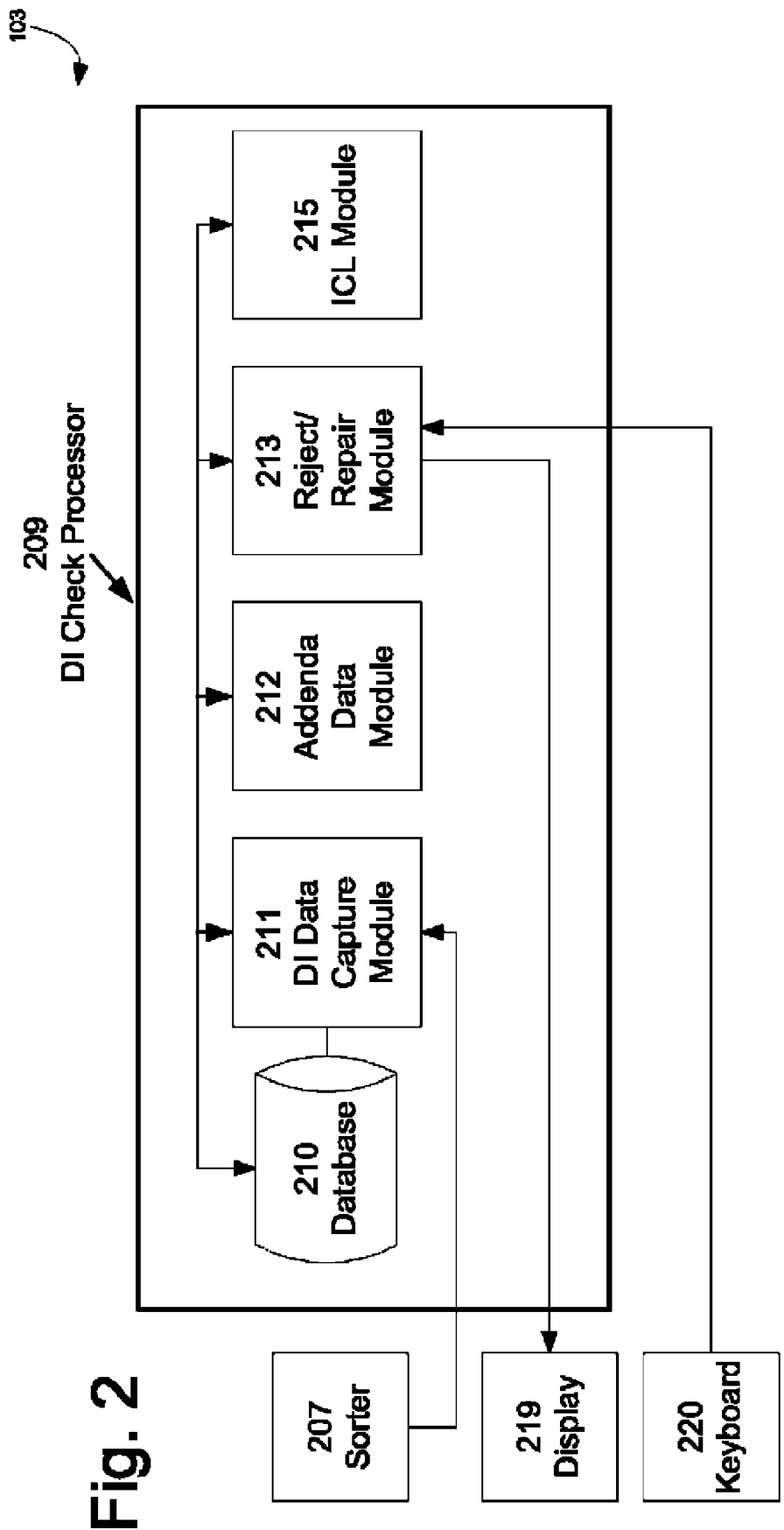
FIG. 2 is a block diagram depicting a depositing institution of a system for processing checks using expanded mass data sets of a financial data file, according to an exemplary embodiment of the invention.
Figure 3:
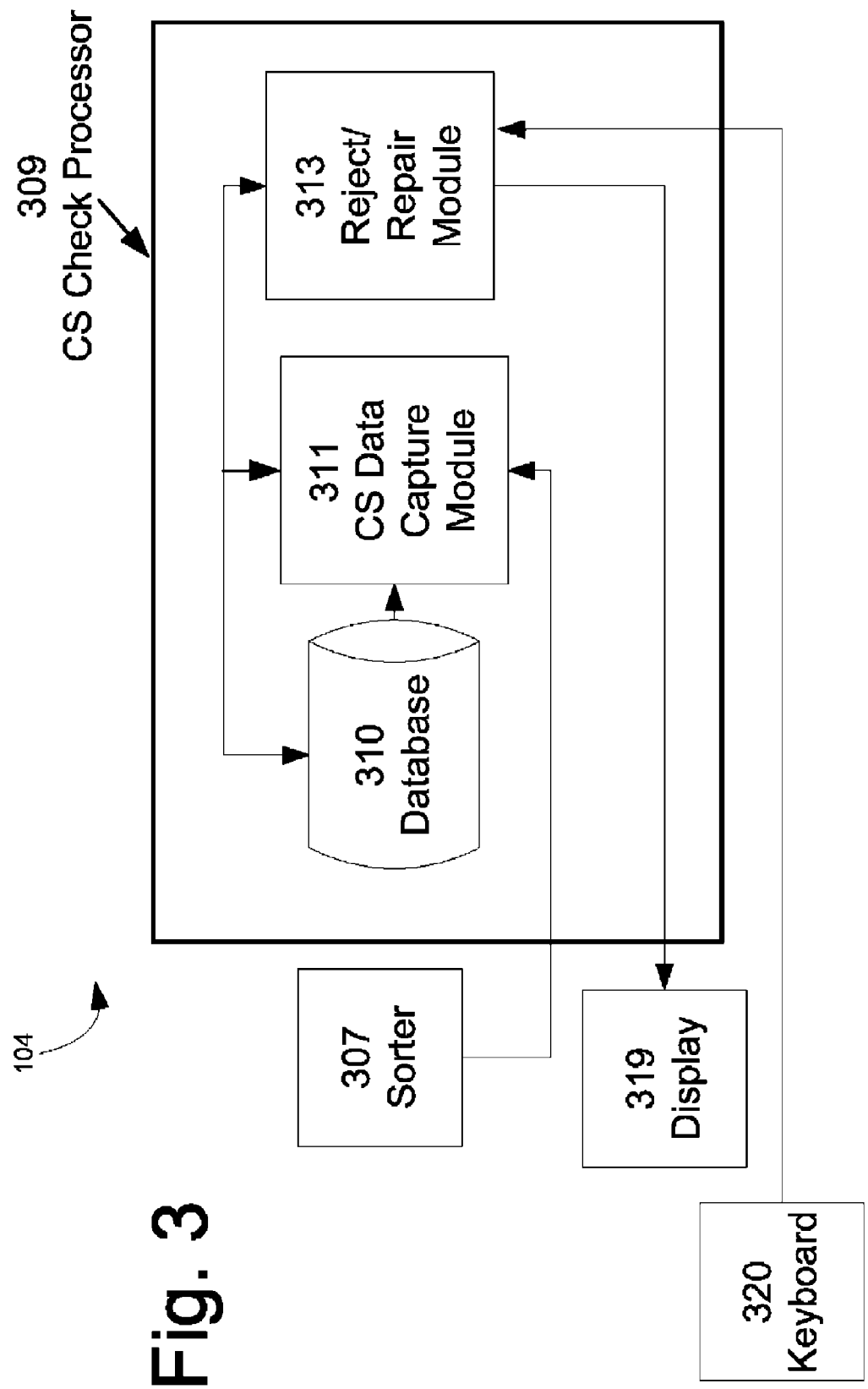
FIG. 3 is a block diagram depicting a capture site of a system for processing checks using expanded mass data sets of a financial data file, according to an exemplary embodiment of the invention.

An exemplary system for processing checks using expanded mass data sets will now be described with reference to FIGS. 1-3. FIG. 1 is a block diagram depicting a system 100 for processing checks using expanded mass data sets of a financial data file, according to an exemplary embodiment of the invention. FIG. 2 is a block diagram depicting a depositing institution 103 of the system 100, according to an exemplary embodiment of the invention. FIG. 3 is a block diagram depicting a capture site 104 of the system 100, according to an exemplary embodiment of the invention.

The system 100 comprises various financial institutions and computer systems involved in check processing. In particular, the system 100 comprises the depositing institution 103, the capture site 104, a check processing site 105, and a receiving institution 125. The depositing institution 103 collects paper checks from a customer. Then, the depositing institution 103 can bundle the paper checks in one or more paper cash letters. Each paper cash letter can comprise one or more bundles of original paper checks and paper image replacement documents, such as substitute checks. The depositing institution 103 forwards the paper checks to the capture site 104 or the check processing site 105 for electronic processing.

Alternatively, the depositing institution 103 can itself generate an electronic image cash letter ("ICL") based on the paper checks. The depositing institution 103 can forward the generated ICL to the check processing site 105 for electronic processing. The ICL can be an electronic file that complies with the American National Standards Institute Specifications for Electronic Exchange of Check and Image Data (ANSI X9.37/X9.100), or other appropriate industry standards, as may change from time to time. The ICL can comprise, for each paper check, one or more electronic images of the check, all of the complete MICR data provided on the check, and additional financial data related to the check.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise a cover page control record comprising information about the origin and destination of the ICL, and a cash letter bundle summary control record comprising a summary of all bundle summary control records in the ICL.

Thus, in alternative embodiments of the invention, the depositing institution 103 can (1) generate an ICL for received checks and forward the ICL to the check processing site 105, (2) forward received paper checks to the capture site 104, or (3) forward received paper checks to the check processing site 105.

The following description discusses an embodiment in which the depositing institution 103 forwards received paper checks to the check processing site 105 via a conventional paper cash letter. The check processing site 105 receives the paper checks from the depositing institution 103. A sorter 107 of the check processing site 105 electronically captures financial data from each received paper check. The sorter 107 comprises an image capture device (not shown), such as a scanner or camera, which captures at least one electronic image of each check. For example, the sorter 107 can capture, for each check, an image of the front of the check and an image of the back of the check. Upon image capture, the sorter 107 forwards each image to a data capture module 111 of a check processor 109 for further processing. The data capture module 111 stores the electronic image(s) in one or more image files, which the data capture module 111 maintains in an image file database 113 of the check processor 109. In one exemplary embodiment of the invention, the sorter 107 and the data capture module 111 can be part of the same physical unit.

The sorter 107 further comprises a MICR reader (not shown) that reads the MICR data from each check. Upon reading the MICR data, the sorter 107 identifies additional financial data related to the check, which is incidental to the processing of the check. For example, the sorter 107 can identify a unique item sequence number, a check processing site identifier, a processing date, a check amount, and/or a routing transit number of the depositing institution 103. The MICR data and additional financial data are collectively referred to herein as "financial data." The sorter 107 forwards the financial data to the data capture module 111 for further processing.

The data capture module 111 stores a form financial data file with multiple fields. For example, the data capture module 111 can store the form financial data file with data fields labeled F1-F7 and F10-F12. The data capture module 111 reads the financial data from the sorter 107 and parses and stores portions of the financial data in each of the data fields. For example, the data capture module 111 can store conventional, truncated financial data in fields F1-F7 of the financial data file. The data capture module 111 can further store untruncated financial data in fields F10-F11 of the financial data file.

The check processor 109 also comprises an image quality analysis module 110, which can evaluate the quality of each captured check image. Certain exemplary systems and methods for performing such an evaluation are described in co-pending U.S. patent application Ser. No. 11/079,120, entitled "Assessing Electronic Image Quality," the disclosure of which is hereby fully incorporated herein by reference. The image quality analysis module 110 communicates the results of the evaluation to the data capture module 111. The data capture module 111 stores the image quality analysis results in a field of the financial data file, such as field F12. Then, the data capture module 111 stores the financial data file in a financial data file database 114 of the check processor 109.

In one embodiment of the invention, the image quality analysis module 110 can store additional data related to the image quality analysis results in field F12 of the financial data file. For example, the image quality analysis module 110 can store a reason for an image quality analysis result in field F12. In addition, an indicator can be stored in field 12 to indicate whether the image(s) corresponding to the data in field F12 has(have) corresponding addenda data.

The functionality of the data capture module 111 is described in more detail below with reference to FIGS. 5A and 5B.

The check processor 109 further comprises an addenda data module 112, which generates and/or captures electronic addenda data for each check. For example, the addenda data can comprise a bank endorsement. The addenda data module 112 inputs the addenda data into one or more addenda data files. The addenda data module 112 stores the addenda data file(s) in an addenda data file database 115 of the check processor 109.

For each check, the data capture module 111 associates the corresponding image file(s), financial data file, and addenda data file(s) for further processing. For example, the data capture module 111 can associate the image file(s), the financial data file, and the addenda data file(s) for a check with a common sequence number, identification number, or other suitable data link known in the art.

The check processor 109 further comprises a reject/repair module 118, which can verify, for each check, the contents of the image file(s) and the financial data file. The reject/repair module 118 analyzes the financial data file for errors. For example, the reject/repair module 118 might detect an error if a field of the financial data file is empty or if it comprises a character or string that is not in the proper format. If an error is detected, the reject/repair module 118 presents the image file(s) and certain of the associated financial data from the financial data file on a display 119 for viewing by a user. In an exemplary embodiment, the display 119 can be a computer monitor or another device suitable for presenting images and textual data to the user.

The reject/repair module 118 presents the financial data from fields F1, F5, and F6 of the financial data file on the display 119. The reject/repair module 118 also presents the complete on us data from field F10 in place of the truncated on us data in data fields F2, F3, and F4 on the display 119. The reject/repair module 118 further presents the complete auxiliary on us data from field F11 in place of the truncated auxiliary on us data in data field F7 on the display 119. Thus, the display 119 presents the user with the complete MICR data from the original paper check.

The user compares the presented financial data with the presented image file(s) and corrects any errors in the financial data via a keyboard 120 or other suitable input device known in the art. For example, where a displayed data field is empty or incorrect but the displayed image of the check comprises data corresponding to the data field, the user can enter the financial data from the displayed image into the displayed data field.

Then, the reject/repair module 118 stores the complete, corrected auxiliary on us data displayed in field F7 in field F11 of the financial data file. The reject/repair module 118 further stores the complete, corrected on us data displayed in fields F2, F3, and F4 in field F10 of the financial data file. In one embodiment of the invention, the reject/repair module 118 truncates the data in each corrected field, in accordance with the requirements of each of data fields F2, F3, F4, and F7. Then, the reject/repair module 118 stores the corrected, truncated data in the corresponding fields of the financial data file.

The functionality of the reject/repair module 118 is described in more detail below with reference to FIGS. 6A and 6B.

The check processor 109 further comprises a check presentment module 116, which is operable to present each received check to the receiving institution 125 for payment. The check presentment module 116 can generate a substitute check file for each check. In an exemplary embodiment, the substitute check file can comprise the check's electronic image(s), the check's financial data, and the check's addenda data. The check presentment module 116 stores the substitute check file in a substitute check database 108 of the check processor 109.

The check presentment module 116 can create at least one ICL comprising the substitute check file(s). Depending on the preferences of the receiving institution 125, the check presentment module 116 can present the ICL electronically or via paper. For example, the check presentment module 116 can electronically transmit the ICL via a network (not illustrated) to an RI computer 126 of the receiving institution 125.

Alternatively, the ICL can be locally or remotely printed for paper delivery. For example, the check presentment module 116 can locally print the ICL on a printer 117 of the check processing site 105. The check presentment module 116 can prepare a print stream comprising the ICL. The check presentment module 116 can transmit the print stream to the printer 117 for printing. An operator at the check processing site 105 can collect one or more of the printed ICLs for delivery to the receiving institution 125. Alternatively, the check presentment module 116 can generate, and transmit to the receiving institution 125, a print stream by which the receiving institution 125 can print the ICL on an RI Printer 127. Certain exemplary systems and methods for generating such a print stream are described in co-pending U.S. Provisional Patent Application No. 60/710,346, entitled "Image Replacement Document Print Streams with Real-Time Audit Data," the disclosure of which is hereby fully incorporated herein by reference.

In an alternative embodiment of the invention, the check presentment module 116 can generate an ICL print stream without first generating an ICL or a substitute check file. The check presentment module 116 can collect data directly from the image file database 113, the financial data file database 114, and/or the addenda data file database 112 for creation of the print stream. The check presentment module 116 can store the collected data in pre-defined fields of a print stream file and transmit the print stream file to the printer 117 or the RI printer 127 for printing.

The functionality of the check presentment module 116 is described in more detail below with reference to FIG. 8.

A person of skill in the art will recognize that the image file database 113, the financial data file database 114, the addenda data file database 115, and the substitute check database 108 can be part of the same physical unit, a single database, or separate components.

In an alternative exemplary embodiment, the depositing institution 103 can forward original or substitute paper checks to the capture site 104 associated with the check processing site 105. Although only one capture site 104 is illustrated in FIG. 1, multiple capture sites can be associated with the check processing site 105. The capture site 104 can perform the check image and financial data capture process and can forward the captured images and data to the check processing site 105.

The capture site 104 receives paper checks from the depositing institution 103 and processes each paper check via a sorter 307. The sorter 307 comprises an image capture device (not shown), such as a scanner or camera, which captures at least one electronic image of each check. For example, the sorter 307 can capture, for each check, an image of the front of the check and an image of the back of the check. Upon image capture, the sorter 307 forwards each image to a CS data capture module 311 of a CS check processor 309 for further processing. The CS data capture module 311 stores the electronic image(s) in one or more image files, which the CS data capture module 311 maintains in a database 310 of the CS check processor 309.

The sorter 307 further comprises a MICR reader (not shown) that reads the MICR data from each check. Upon reading the MICR data, the sorter 307 identifies additional financial data related to the check, which is incidental to the processing of the check. For example, the sorter 307 can identify a unique item sequence number, a check processing site identifier, a processing date, a check amount, and/or a routing transit number of the depositing institution 103. The sorter 307 forwards the financial data to the CS data capture module 311 for further processing. In one exemplary embodiment of the invention, the sorter 307 and the CS data capture module 311 can be part of the same physical unit.

The CS data capture module 311 stores a form financial data file with multiple fields. For example, the CS data capture module 311 can store the form financial data file with fields F1-F7 and F10-F12. The CS data capture module 311 reads the financial data from the sorter 307 and parses and stores portions of the financial data in each of the data fields. For example, the CS data capture module 311 can store truncated financial data in fields F1-F7 of the financial data file. The CS data capture module 311 can further store untruncated financial data in fields F10-F11 of the financial data file. The fields of the financial data file can comprise all of the MICR data from the original paper check. The CS data capture module 311 stores the financial data file in the database 310.

The CS check processor 309 further comprises a reject/repair module 313, which can verify, for each check, the contents of the image file(s) and the financial data file. The reject/repair module 313 analyzes the financial data file for errors. For example, the reject/repair module 313 might detect an error if a field of the financial data file is empty or if it comprises a character or string that is not in the proper format. If an error is detected, the reject/repair module 313 presents the image file(s) and certain of the associated financial data from the financial data file on a display 319 for viewing by a user. In an exemplary embodiment, the display 319 can be a computer monitor or another device suitable for presenting images and textual data to the user.

The reject/repair module 313 presents the financial data from fields F1, F5, and F6 of the financial data file on the display 319. The reject/repair module 313 also presents the complete on us data from field F10 in place of the truncated on us data in fields F2, F3, and F4 on the display 319. The reject/repair module 313 further presents the complete auxiliary on us data from field F11 in place of the truncated auxiliary on us data in field F7 on the display 319. Thus, the display 319 presents a user with all of the MICR data from the original paper check.

The user compares the presented financial data with the presented image file(s) and corrects any errors in the financial data via a keyboard 320 or other suitable input device known in the art. For example, where a displayed data field is empty or incorrect but the displayed image of the check comprises data corresponding to the data field, the user can enter the financial data from the displayed image into the displayed data field.

Then, the reject/repair module 313 stores the complete, corrected auxiliary on us data displayed in field F7 in field F11 of the financial data file. The reject/repair module 313 further stores the complete, corrected on us data displayed in fields F2, F3, and F4 in field F10 of the financial data file. In one embodiment of the invention, the reject/repair module 313 can truncate the data in each corrected field, in accordance with the requirements of each of fields F2, F3, F4, and F7. Then, the reject/repair module 313 stores the corrected, truncated data in corresponding fields of the financial data file.

The functionality of the reject/repair module 313 is described in more detail below with reference to FIGS. 6A and 6B.

For each check, the CS data capture module 311 can forward the electronic image(s) of the check and the check's financial data to the data capture module 111 of the check processing site 105 for further processing, as discussed above with reference to FIG. 1. In this case, the forwarded data can be stored in the appropriate database(s) and can be accessed via the check presentment module 116 to prepare the requested form of presentment to the receiving institution 125. At the check processing site 105, the data capture module 111 processes the financial data and images for presentment to the receiving institution 125.

In an alternative embodiment of the invention, the capture site(s) 104 can retain the electronic check images in the database 310 of the CS check processor 309. In this case, the check processing site 105 can access the electronic image(s) of the check and/or the check's financial data from the database 310 of the CS check processor 309 for further processing. For example, the check presentment module 116 of the check processing site 105 can use electronic image(s) of the check from the database 310 to generate a substitute check file or an ICL for the check. The check presentment module 116 can generate the substitute check file or ICL without any electronic check image(s). The substitute check file or ICL can include financial data from the financial data file database 114 and/or addenda data from the addenda data file database 115. Then, the check presentment module 116 can identify the check(s) to which the substitute check file or ICL corresponds and the capture site(s) 104 at which image(s) of the identified check(s) are stored. For each identified capture site 104, the check presentment module 116 can forward the corresponding substitute check file or ICL to the CS check processor 309 of the capture site 104. The substitute check file or ICL can include a list of the check image(s) corresponding to the substitute check file or ICL. The CS check processor 309 can identify the listed image(s) in the database 310 and can incorporate the image(s) into the substitute check file or ICL. Upon incorporating the image(s), the CS check processor 309 can transmit the substitute check file or ICL comprising the image(s) to the check presentment module 116 for further processing.

In another alternative exemplary embodiment, the depositing institution 103 can create an ICL based on the paper checks and can communicate the ICL to the check processing site 105. In this case, the depositing institution 103 can comprise components similar to those of the check processing site 105. The depositing institution 103 processes paper checks at a sorter 207. The sorter 207 electronically captures information from each paper check. The sorter 207 comprises an image capture device (not shown), such as a scanner or camera, which captures at least one electronic image of each check. For example, the sorter 207 can capture, for each check, an image of the front of the check and an image of the back of the check. Upon image capture, the sorter 207 forwards each image to a DI data capture module 211 of a DI check processor 209 for further processing. The DI data capture module 211 can store the electronic image(s) in one or more image files, which the depositing institution data capture module 211 maintains in a database 210 of the DI check processor 209. In one exemplary embodiment of the invention, the sorter 207 and the DI data capture module 211 can be part of the same physical unit.

The sorter 207 further comprises a MICR reader (not shown) that reads the MICR data from each check. Upon reading the MICR data, the sorter 207 identifies additional financial data related to the check, which is incidental to the processing of the check. For example, the sorter 207 can identify a unique item sequence number, a check processing site identifier, a processing date, a check amount, and/or a routing transit number of the depositing institution 103. The sorter 207 forwards the financial data to the DI data capture module 211 for further processing.

The DI data capture module 211 stores a form financial data file with multiple fields. For example, the DI data capture module 211 can store the form financial data file with fields F1-F7 and F10-F12. The DI data capture module 211 reads the financial data from the sorter 207 and parses and stores portions of the financial data in each of the data fields. For example, the DI data capture module 211 can store truncated financial data in fields F1-F7 of the financial data file. The DI data capture module 211 can further store untruncated financial data in fields F10-F11 of the financial data file. The fields of the financial data file can comprise all of the MICR data from the original paper check. The DI data capture module 211 stores the financial data file in the database 210.

The DI check processor 209 further comprises an addenda data module 212, which generates and/or captures electronic addenda data for each check. For example, the addenda data can comprise a bank endorsement. The addenda data module 212 inputs the addenda data into one or more addenda data files. The addenda data module 212 stores the addenda data file(s) in the database 210.

For each check, the DI data capture module 211 associates the corresponding image file(s), financial data file, and addenda data file(s) for a check with a sequence number, identification number, or other suitable data link known in the art.

The DI check processor 209 further comprises a reject/repair module 213, which can verify, for each check, the contents of the image file(s) and the financial data file. The reject/repair module 213 analyzes the financial data file for errors. For example, the reject/repair module 213 might detect an error if a field of the financial data file is empty or if it comprises a character or string that is not in the proper format. If an error is detected, the reject/repair module 213 presents the image file(s) and certain of the associated financial data from the financial data file on a display 219 for viewing by a user. In an exemplary embodiment, the display 219 can be a computer monitor or another device suitable for presenting images and textual data to the user.

The reject/repair module 213 presents the financial data from fields F1, F5, and F6 of the financial data file on the display 219. The reject/repair module 213 also presents the complete on us data from field F10 in place of the truncated on us data in fields F2, F3, and F4 on the display 219. The reject/repair module 213 further presents the complete auxiliary on us data from field F11 in place of the truncated auxiliary on us data in field F7 on the display 219. Thus, the display 219 presents the user with the complete MICR data from the original paper check.

The user compares the presented financial data with the presented image file(s) and corrects any errors in the financial data via a keyboard 220 or other suitable input device known in the art. For example, where a displayed data field is empty or incorrect but the displayed image of the check comprises data corresponding to the data field, the user can enter the financial data from the displayed image into the displayed data field.

Then, the reject/repair module 213 stores the complete, corrected auxiliary on us data displayed in field F7 in field F11 of the financial data file. The reject/repair module 213 further stores the complete, corrected on us data displayed in fields F2, F3, and F4 in field F10 of the financial data file. In one embodiment of the invention, the reject/repair module 213 truncates the data in each corrected field, in accordance with the requirements of each of fields F2, F3, F4, and F7. Then, the reject/repair module 213 stores the corrected, truncated data in the corresponding fields of the financial data file.

The functionality of the reject/repair module 213 is described in more detail below with reference to FIGS. 6A and 6B.

The DI check processor 209 further comprises an ICL module 215, which generates at least one ICL comprising information regarding one or more bundles of checks. Each bundle can comprise one or more checks. For each check, the ICL can include the electronic image(s) from the check's image file(s), the financial data from the check's financial data file, and the addenda data from the check's addenda data file.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise a cover page control record comprising information about the origin and destination of the ICL, and a cash letter bundle summary control record comprising a summary of all bundle summary control records in the ICL. The DI check processor 209 can forward the ICL to the data capture module 111 of the check processing site 105 for further processing.

Those skilled in the art will appreciate that exemplary system 100 is merely representative of the components for processing checks using expanded mass data sets of a financial data file. Other embodiments of the invention may not have all of the components identified in FIGS. 1-3 or can include additional components.

Figure 4:
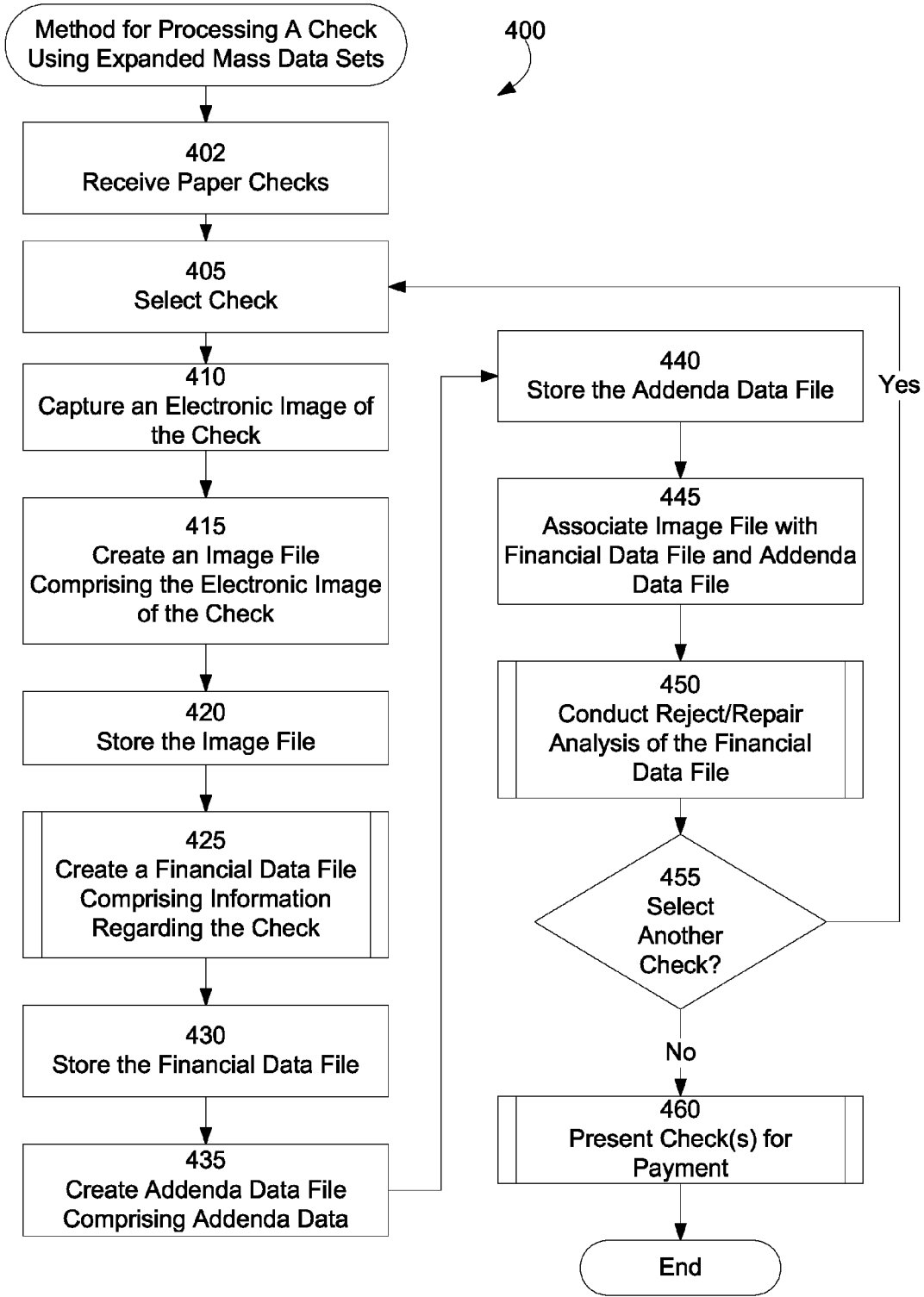
FIG. 4 is a flow chart depicting a method for processing checks using expanded mass data sets of a financial data file, according to an exemplary embodiment of the invention.

FIG. 4 is a flow chart depicting a method 400 for processing checks using expanded mass data sets of a financial data file, according to an exemplary embodiment of the invention. The exemplary method 400 is illustrative and, in alternative embodiments of the invention, certain steps can be performed in a different order, in parallel with one another, or omitted entirely, and/or certain additional steps can be performed without departing from the scope and spirit of the invention. The method 400 is described below with reference to FIGS. 1 and 4.

In step 402, the check processing site 105 receives a conventional paper cash letter comprising original and/or substitute paper checks from the depositing institution 103. At the check processing site 105, the paper checks are initially processed via the sorter 107. In step 405, the sorter 107 selects a check for processing. In step 410, the sorter 107 captures at least one electronic image of the check. In an exemplary embodiment, the sorter 107 captures an image of the front of the check and an image of the back of the check. In step 415, the sorter 107 communicates the captured electronic image(s) to the data capture module 111, which creates at least one image file comprising the electronic image(s). In step 420, the data capture module 111 stores the image file(s) in the image file database 113.

In step 425, the data capture module 111, in conjunction with the sorter 107 and the image quality analysis module 110, creates a financial data file comprising information regarding the check. For example, the financial data file can comprise the check's financial data and the results of an image quality analysis performed on the captured electronic image(s) of the check. Step 425 is described in more detail below with reference to FIG. 5. In step 430, the data capture module 111 stores the financial data file in the financial data file database 114.

In step 435, the addenda data module 112 creates an addenda data file comprising addenda data for the check. The addenda data module 112 can generate and/or capture the addenda data from the check. In an exemplary embodiment, the addenda data can comprise a bank endorsement, a check processing date, a processing sequence number, and/or an image quality record. In step 440, the addenda data module 112 stores the addenda data file in the addenda data file database 115.

In step 445, the data capture module 111 associates the check's image file(s), financial data file, and addenda data file(s) with each other. For example, the data capture module 111 can associate the image file(s), the financial data file, and the addenda data file(s) via a common sequence number, identification number, file name, or other suitable data link known in the art.

In step 450, the reject/repair module 118 conducts a reject/repair analysis of the check's financial data file. The reject/repair module 118 allows detection and correction of certain errors in the financial data file. Step 450 is discussed in more detail below with reference to FIGS. 6A and 6B.

In step 455, the sorter 107 determines whether to select another check for image/financial data capture. If so, the method 400 branches back to step 405 to repeat the image/financial data capture of another check. If the sorter 107 will not select another check, then the method 400 branches to step 460 to present the selected check(s) for payment. Step 460 is described in more detail below with reference to FIG. 7.

Figure 5A:
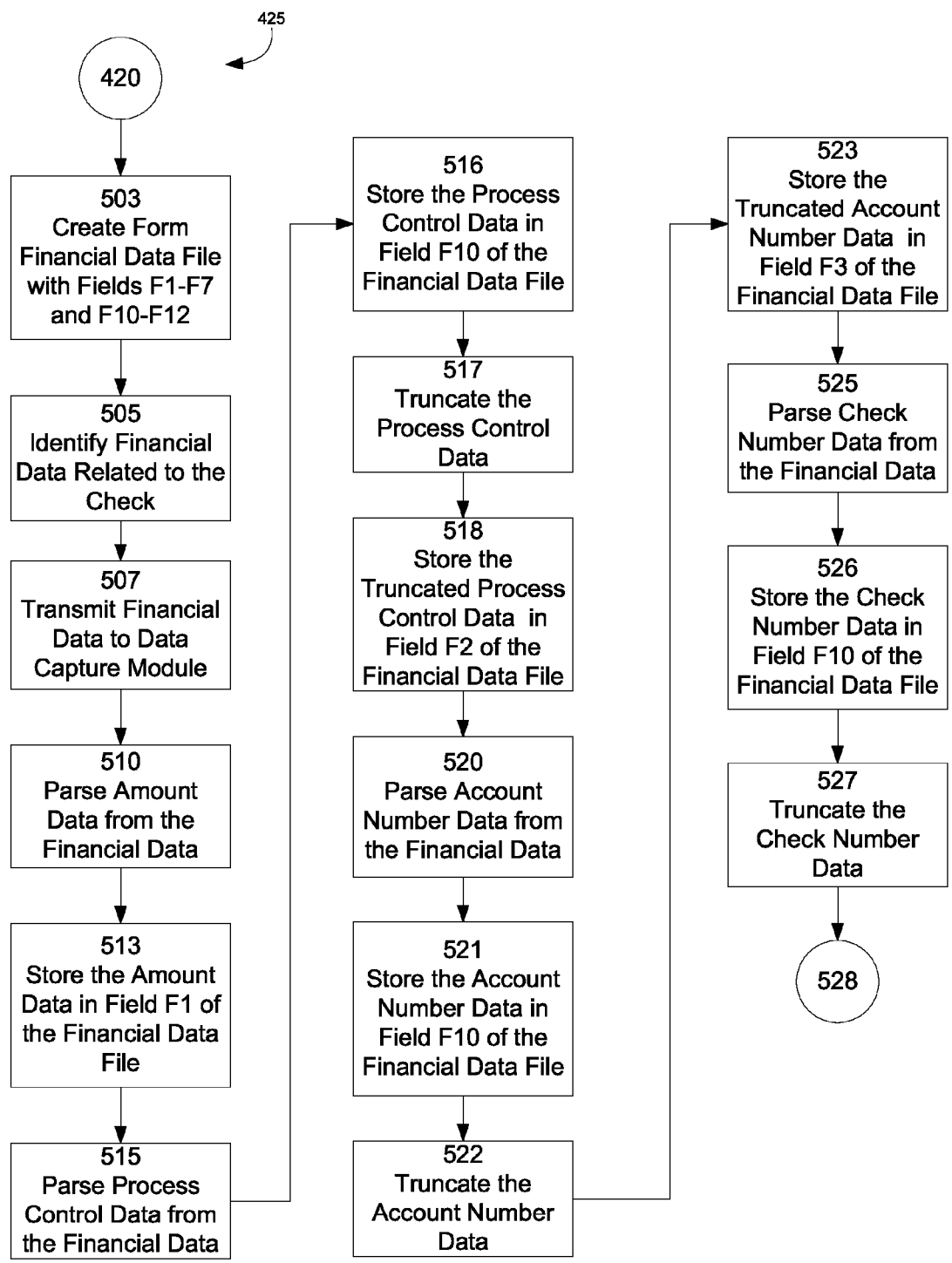
FIG. 5A and FIG. 5B are flow charts depicting a method for creating a financial data file comprising expanded mass data sets, according to an exemplary embodiment of the invention
Figure 5B:
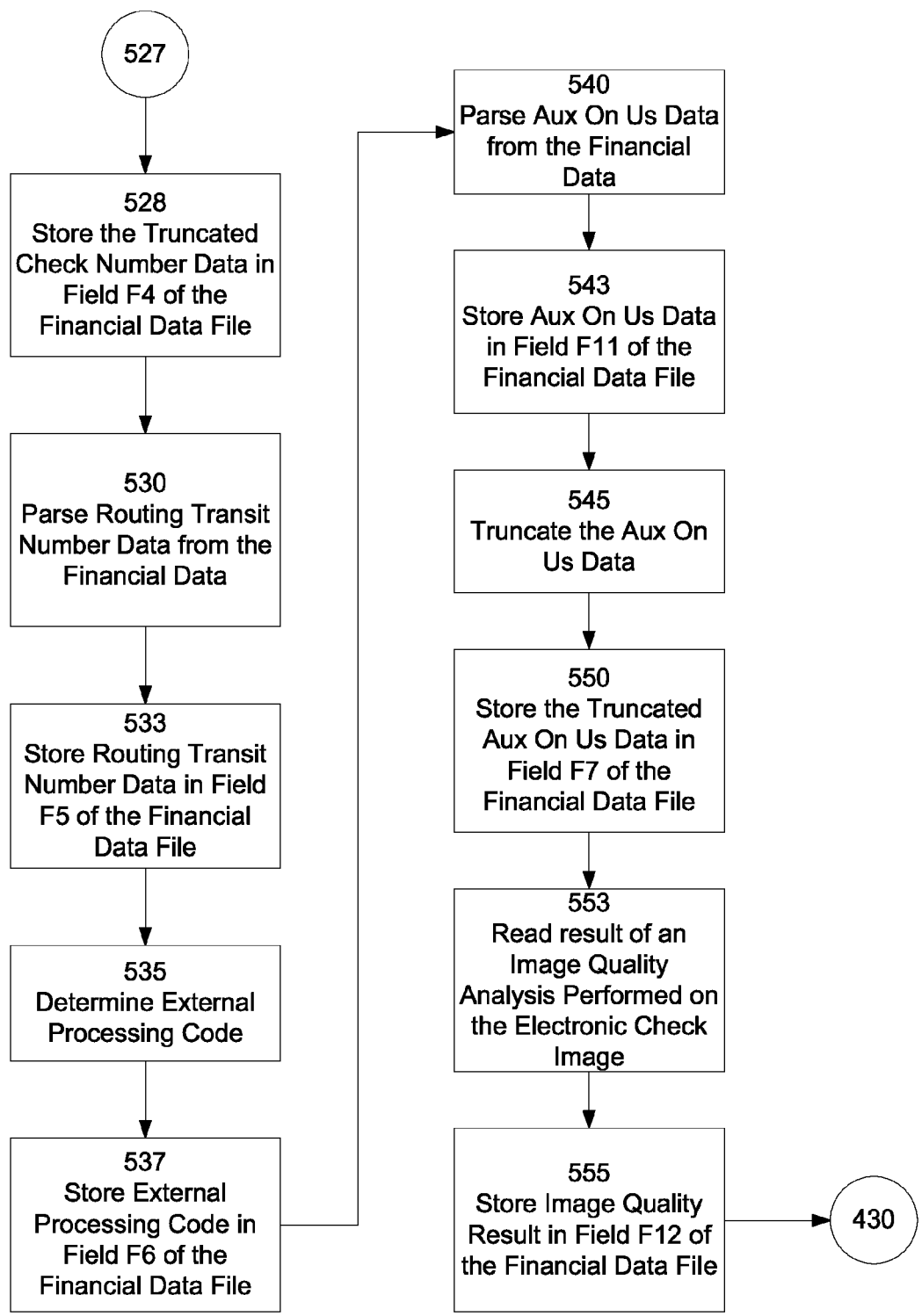

FIG. 5A and FIG. 5B are flow charts depicting a method 425 for creating a financial data file comprising expanded mass data sets, according to an exemplary embodiment of the invention, as referred to in step 425 of FIG. 4. The exemplary method 425 is merely illustrative and, in alternative embodiments of the invention, certain steps can be performed in a different order, performed in parallel with one another, or omitted entirely, and/or certain additional steps can be performed without departing from the scope and spirit of the invention. The method 425 is described below with reference to FIGS. 1 and 5.

In step 503, a form financial data file is created with fields F1-F7 and F10-F12, and the form financial data file is stored by the data capture module 111. The data capture module 111 can configure fields F1-F7 of the form financial data file to receive truncated financial data. For example, the data capture module 111 can designate that Field F2 cannot include any dashes or other extraneous characters. The data capture module 111 can further designate that Field F2 can receive only up to three bytes of data or a specified number of characters.

The fields F1-F7 correspond to the standard fields established by the American National Standards Institute Specifications for Electronic Exchange of Check and Image Data (ANSI X9.37/X9.100), which establish the specific type, format, and amount of data for each of those fields. Note that, in certain exemplary embodiments of the invention, the fields F1-F7 can correspond to other appropriate industry standards, as may change from time to time. For example, the data stored in the financial data file can comprise amount data stored in field F1, process control data stored in field F2, account number data stored in field F3, check number data stored in field F4, routing transit number data stored in field F5, an external processing code stored in field F6, and auxiliary on us data stored in field F7.

In step 505, the sorter 107 identifies financial data related to the paper check. For example, the sorter 107 can read MICR data from the check and can identify other financial data that is incidental to the processing of the check. The MICR data can comprise a check amount, process control data, account number data, check number data, a payor bank's routing transit number, and auxiliary on us data. Additionally, the sorter 107 can identify a unique item sequence number, a check processing site identifier, a processing date, and/or a routing transit number of the depositing institution 103.

In step 507, the sorter 107 transmits the identified financial data to the data capture module 111. In step 510, the data capture module 111 parses amount data from the financial data. The term "amount data" is used herein to refer to financial data that relates to the value of the check. For example, the amount data can comprise the U.S. dollar value of the check, which can be expressed in cents. In step 513, the data capture module 111 stores the amount data in field F1 of the financial data file created in step 503.

In step 515, the data capture module 111 parses process control data from the financial data. The term "process control data" is used herein to refer to a check number or transaction code that a bank uses to identify an item or a group of items. In step 516, the data capture module 111 stores the process control data in field F10 of the financial data file.

In step 517, the data capture module 111 truncates the process control data to remove extraneous characters such as dashes and to remove excess characters, as required by field F2. For example, if field F2 only can receive up to three bytes of data and the process control data is ten bytes long, the data capture module 111 can truncate seven bytes of data from the process control data. In step 518, the data capture module 111 stores the truncated process control data in field F2 of the financial data file.

In step 520, the data capture module 111 parses account number data from the financial data. The term "account number data" is used herein to refer to information related to the check payor's account at the receiving institution. In step 521, the data capture module 111 stores the account number data in field F10 of the financial data file, next to the process control data stored in field F10 in step 516. In exemplary embodiments, the account number data and the process control data in field F10 can be separated by a dash, colon, or other suitable separator.

In step 522, the data capture module 111 truncates the account number data to remove extraneous characters such as dashes and to remove excessive characters, as required by field F3. For example, if field F3 only can receive up to eight bytes of data and the account number data is ten bytes long, the data capture module 111 can truncate two bytes of data from the account number data. In step 523, the data capture module 111 stores the truncated account number data in field F3 of the financial data file.

In step 525, the data capture module 111 parses check number data from the financial data. The term "check number data" is used herein to refer to information that can be used to identify the check, including, e.g., a number or a sequence of letters, characters, and/or numbers. In step 526, the data capture module 111 stores the check number data in field F10 of the financial data file, next to the account number data stored in field F10 in step 521. For example, the check number data and the account number data in field F10 can be separated by a dash, colon, or other suitable separator.

In step 527, the data capture module 111 truncates the check number data to remove extraneous characters such as dashes and to remove excessive characters, as required by field F4. For example, if field F4 only can receive up to two bytes of data and the check number data is nine bytes long, the data capture module 111 can truncate seven bytes of data from the check number data. In step 528, the data capture module 111 stores the truncated check number data in field F4 of the financial data file.

In step 530, the data capture module 111 parses routing transit number data from the financial data. The term "routing transit number data" is used herein to refer to information that can be used to identify the bank by or through which the check is payable, including, e.g., a number or a sequence of letters, characters, and/or numbers. In step 533, the data capture module 111 stores the routing transit number data in field F5 of the financial data file.

In step 535, the data capture module 111 determines an external processing code for the check. The term "external processing code" is used herein to refer to information that can be used to uniquely identify a group of items. For example the external processing code can identify certain items as return items, certain items as substitute checks, and certain items as substitute checks for return items. In step 537, the data capture module 111 stores the external processing code in field F6 of the financial data file.

In step 540, the data capture module 111 parses auxiliary on us data from the financial data. The term "auxiliary on us data" is used herein to refer to information that can be used to uniquely identify a check. For example, the auxiliary on us data can comprise a serial number or other unique set of numbers, letters, and/or characters. In step 543, the data capture module 111 stores the auxiliary on us data in field F11 of the financial data file.

In step 545, the data capture module 111 truncates the auxiliary on us data to remove extraneous characters such as dashes and to remove excess characters, as required by field F7. For example, if field F7 can only receive up to six bytes of data and the auxiliary on us data is nine bytes long, the data capture module 111 can truncate three bytes of data from the auxiliary on us data. In step 550, the data capture module 111 stores the truncated auxiliary on us data in field F7 of the financial data file.

In step 553, the data capture module 111 reads at least one result of an image quality analysis performed on the electronic image(s) of the check. In step 555, the data capture module 111 stores the image quality analysis result(s) in field F12 of the financial data file. The method 425 then branches to step 430 (FIG. 4).

Figure 6A:
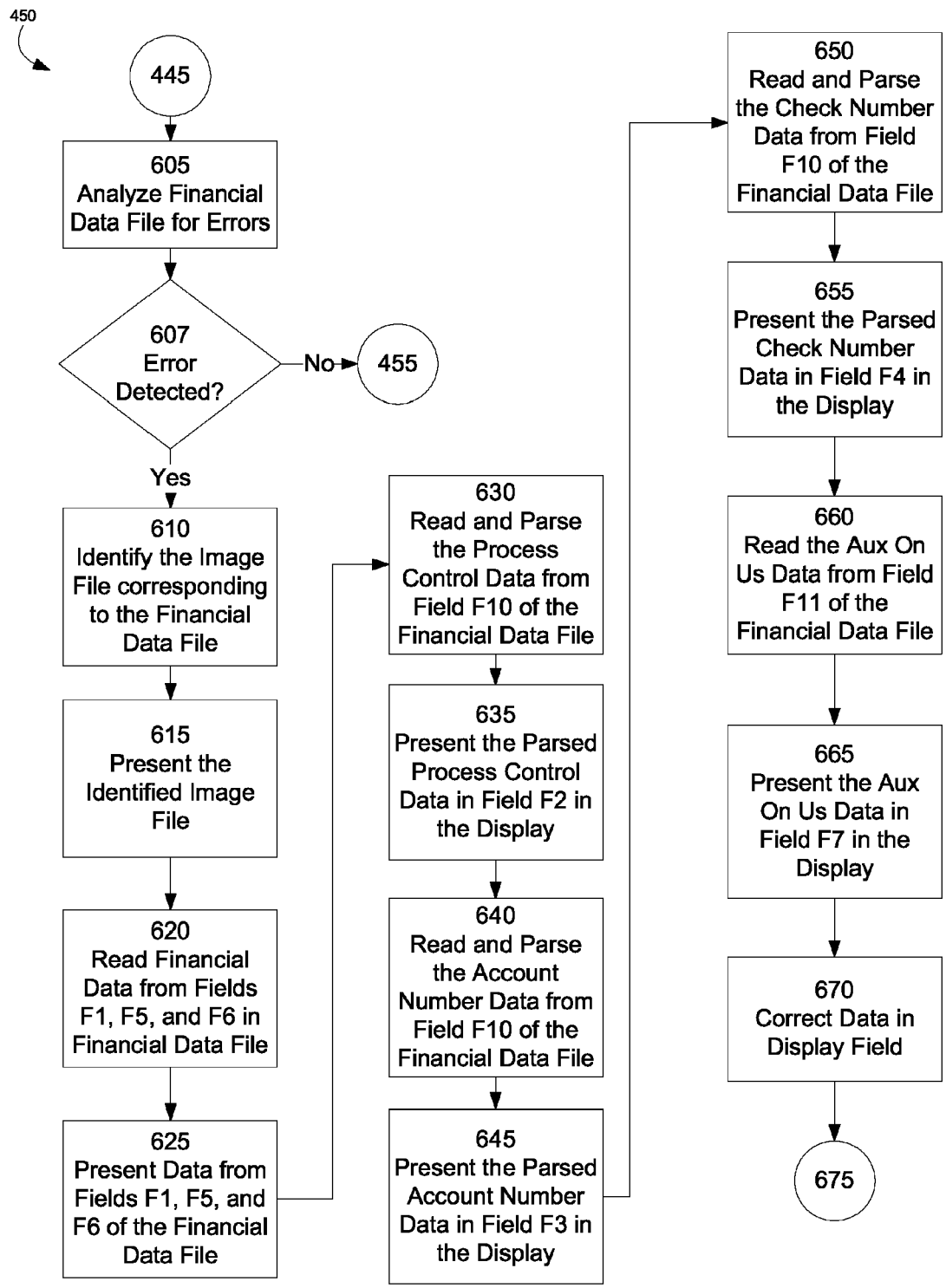
FIG. 6A and FIG. 6B are flow charts depicting a method for conducting a reject/repair analysis of a financial data file using expanded mass data sets of the financial data file, according to an exemplary embodiment of the invention.
Figure 6B:
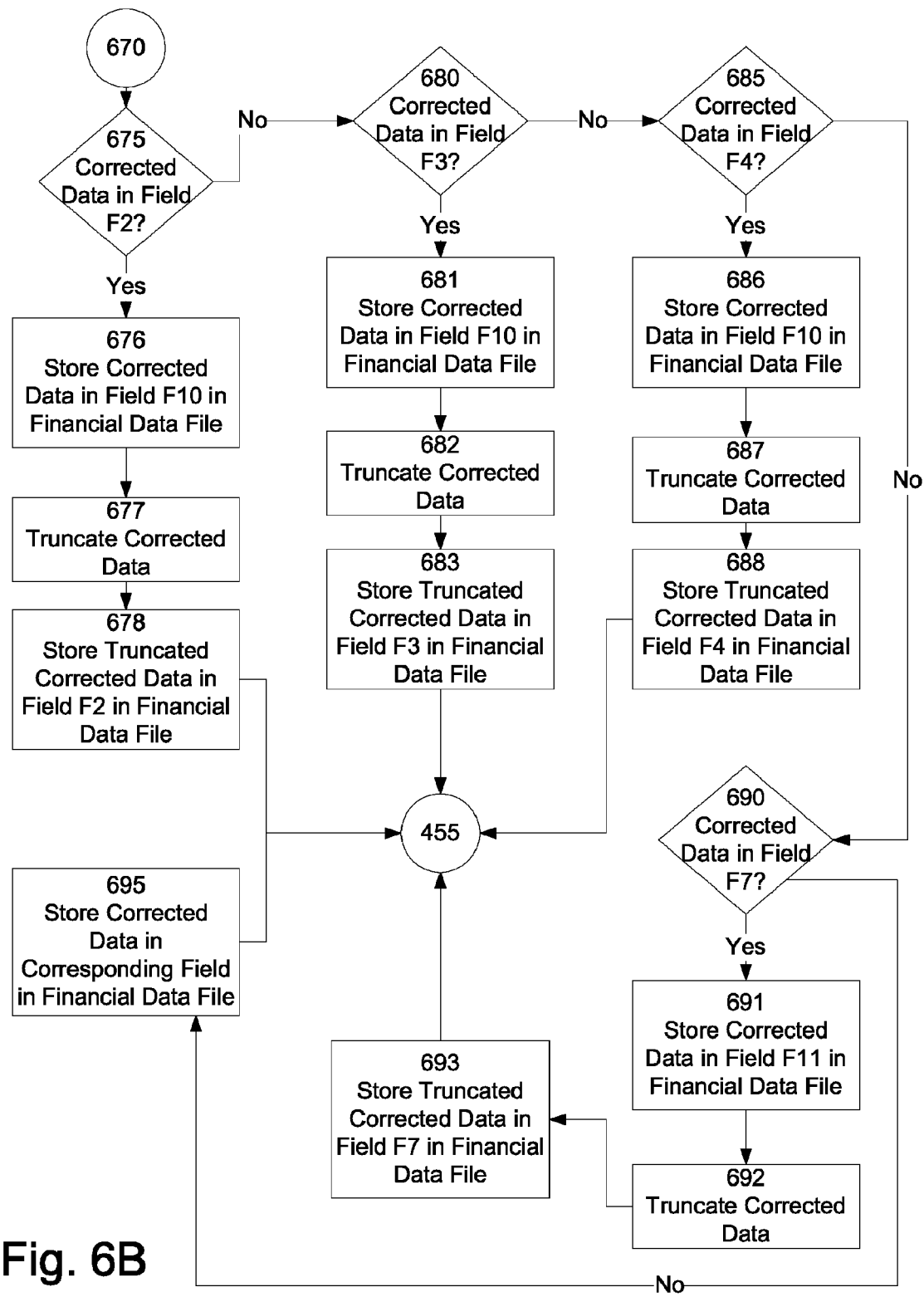

FIG. 6A and FIG. 6B are flow charts depicting a method 450 for conducting a reject/repair analysis of a financial data file using expanded mass data sets of the financial data file, according to an exemplary embodiment of the invention, as referred to in step 450 of FIG. 4. The exemplary method 450 is merely illustrative and, in alternative embodiments of the invention, certain steps can be performed in a different order, performed in parallel with one another, or omitted entirely, and/or certain additional steps can be performed without departing from the scope and spirit of the invention. The method 450 is described below with reference to FIGS. 1 and 6.

In step 605, the reject/repair module 118 analyzes the financial data file for errors. For example, the reject/repair module 118 can detect an error if a field of the financial data file is empty, comprises data in an incorrect format, or comprises the wrong data. In step 607, the reject/repair module 118 determines whether it detected an error. If not, the method 450 branches to step 455 (FIG. 4). If the reject/repair module 118 detects an error, the method 450 branches to step 610.

In step 610, the reject/repair module 118 identifies the image file(s) corresponding to the financial data file. For example, the reject/repair module 118 can identify the image file(s) with the same file name, sequence number, or identification number as the financial data file. In step 615, the reject/repair module 118 presents the image(s) identified in step 610 on the display 119 for viewing by a user. In step 620, the reject/repair module 118 reads the data in fields F1 (amount data), F5 (routing transit number data), and F6 (external process code) of the financial data file. In step 625, the reject/repair module 118 presents the data from fields F1, F5, and F6 of the financial data file on the display 119 for viewing by the user.

In steps 630-665, the reject/repair module 118 presents the untruncated financial data, i.e., the financial data in fields F10 and F11 of the financial data file, in fields F2, F3, F4, and F7 on the display 119.

In step 630, the reject/repair module 118 reads and parses the process control data from field F10 of the financial data file. In step 635, the reject/repair module 118 presents the parsed process control data from field F10 in field F2 on the display 119. Thus, the untruncated process control data from field F10 is displayed in field F2.

In step 640, the reject/repair module 118 reads and parses the account number data from field F10 of the financial data file. In step 645, the reject/repair module 118 presents the parsed account number data from field F10 in field F3 on the display 119. Thus, the untruncated account number data from field F10 is displayed in field F3.

In step 650, the reject/repair module 118 reads and parses the check number data from field F10 of the financial data file. In step 655, the reject/repair module 118 presents the parsed check number data from field F10 in field F4 on the display 119. Thus, the untruncated check number data from field F10 is displayed in field F4. In step 660, the reject/repair module 118 reads the auxiliary on us data from field F11 of the financial data file. In step 665, the reject/repair module 118 presents the auxiliary on us data from field F11 in field F7 on the display 119. Thus, the untruncated auxiliary on us data from field F11 is displayed in field F7.

By presenting the untruncated financial data in the display 119, the reject/repair module 118 allows a user to evaluate and correct errors in the financial data file using the complete MICR data from the original paper check. The reject/repair module 118 also allows a user to correct errors in both the truncated and untruncated data in the financial data file. In step 670, the user compares the displayed financial data with the displayed electronic check image(s) to determine how to correct the financial data file error. The user can correct the data in the display 119 by inputting the correct data into the reject/repair module via a keyboard 120 or another input device. For example, where a displayed data field is empty but the displayed image of the check comprises data corresponding to the data field, the user can enter the financial data from the displayed image into the displayed data field.

In steps 675-695, the reject/repair module 118 stores the corrected data in the financial data file. In step 675, the reject/repair module 118 determines whether the corrected data is in field F2 in the display 119. If so, the method 450 branches to step 676. In step 676, the reject/repair module 118 stores the corrected process control data in place of the process control data in field F10 of the financial data file. In step 677, the reject/repair module 118 truncates the corrected process control data, as described above in conjunction with FIG. 5, step 517. In step 678, the reject/repair module 118 stores the truncated, corrected process control data in field F2 in the financial data file, and the method 450 continues to step 455 (FIG. 4).

If the reject/repair module 118 determines in step 675 that the corrected data is not in field F2, then the method 450 branches to step 680. In step 680, the reject/repair module 118 determines whether the corrected data is in field F3 in the display 119. If so, the method 450 branches to step 681. In step 681, the reject/repair module 118 stores the corrected account number data in place of the account number data in field F10 of the financial data file. In step 682, the reject/repair module 118 truncates the account number data, as described above in conjunction with FIG. 5, step 522. In step 683, the reject/repair module 118 stores the truncated, corrected account number data in field F3 in the financial data file, and the method 450 continues to step 455 (FIG. 4).

If the reject/repair module 118 determines in step 680 that the corrected data is not in field F3, then the method 450 branches to step 685. In step 685, the reject/repair module 118 determines whether the corrected data is in field F4 in the display 119. If so, the method 450 branches to step 686. In step 686, the reject/repair module 118 stores the corrected check number data in place of the check number data in field F10 of the financial data file. In step 687, the reject/repair module 118 truncates the check number data, as described above in conjunction with FIG. 5, step 527. In step 688, the reject/repair module 118 stores the truncated, corrected check number data in field F4 in the financial data file, and the method 450 continues to step 455 (FIG. 4).

If the reject/repair module 118 determines in step 685 that the corrected data is not in field F4, then the method 450 branches to step 690. In step 690, the reject/repair module 118 determines whether the corrected data is in field F7 in the display 119. If so, the method 450 branches to step 691. In step 691, the reject/repair module 118 stores the corrected auxiliary on us data in place of the auxiliary on us data in field F11 of the financial data file. In step 692, the reject/repair module 118 truncates the auxiliary on us data, as described above in conjunction with FIG. 5, step 545. In step 693, the reject/repair module 118 stores the truncated, corrected auxiliary on us data in field F7 in the financial data file, and the method 450 continues to step 455 (FIG. 4).

If the reject/repair module 118 determines in step 690 that the corrected data is not in field F7, then the method 450 branches to step 695. In step 695, the reject/repair module 118 stores the corrected data in the corresponding field in the financial data file. For example, if the corrected data is in displayed field F1, F5, or F6, the reject/repair module 118 can store the corrected data in field F1, F5, or F6, respectively, of the financial data file. The method 450 continues to step 455 (FIG. 4).

Figure 7:
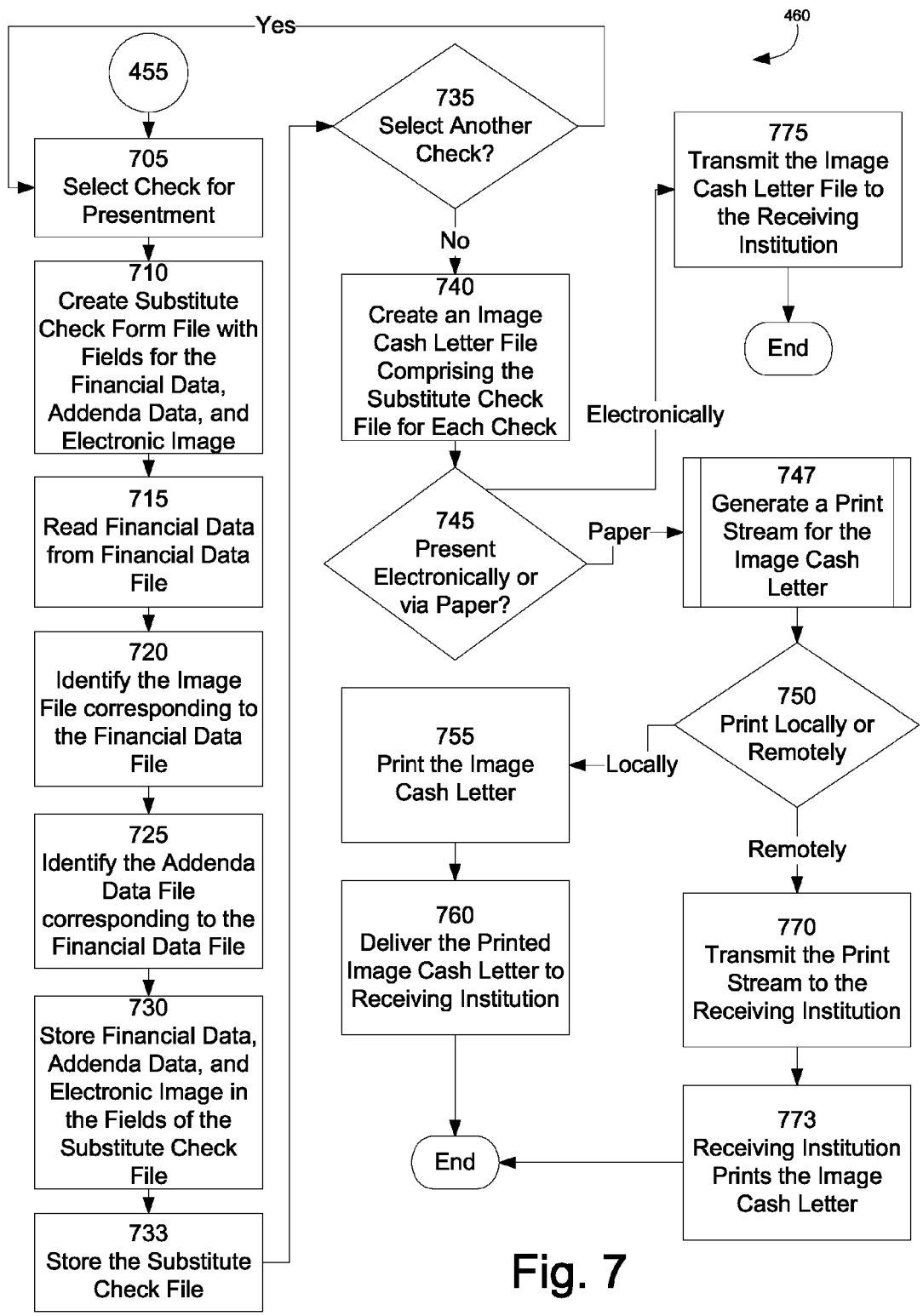
FIG. 7 is a flow chart diagram depicting a method for presenting a check for payment based on expanded mass data sets of a financial data file, according to an exemplary embodiment of the invention.

FIG. 7 is a flow chart depicting a method 460 for presenting a check for payment based on expanded mass data sets of a financial data file, according to an exemplary embodiment of the invention, as referred to in step 460 of FIG. 4. The exemplary method 460 is merely illustrative and, in alternative embodiments of the invention, certain steps can be performed in a different order, performed in parallel with one another, or omitted entirely, and/or certain additional steps can be performed without departing from the scope and spirit of the invention. The method 460 is described below with reference to FIGS. 1 and 7.

In step 705, the check presentment module 116 selects a check for presentment to the receiving institution 125. In step 710, the check presentment module 116 generates a substitute check form file with fields for the check's financial data, addenda data, and electronic image(s). By entering the financial data, addenda data, and electronic image(s) into the appropriate fields, the check presentment module 116 can create a substitute check file that can be used to present a substitute check and/or an ICL to the receiving institution 125.

In step 715, the check presentment module 116 reads the check's financial data from the financial data file. In step 720, the check presentment module 116 identifies the image file(s) corresponding to the financial data file. For example, the check presentment module 116 can identify the image file(s) with the same file name, sequence number, or identification number as the financial data file. In step 725, the check presentment module 116 identifies the addenda data file(s) corresponding to the financial data file. For example, the check presentment module 116 can identify the addenda data file(s) with the same file name, sequence number, or identification number as the financial data file.

In step 730, the check presentment module 116 stores the financial data from the financial data file, the addenda data from the identified addenda data file(s), and the electronic image(s) from the identified image file(s) in the appropriate fields of the substitute check file. In this regard, the complete, untruncated data from fields F10 and F11 of the financial data file is stored in the substitute check file, thereby including the information necessary for a substitute check to comply with the requirements of the Act. In step 733, the check presentment module 116 stores the substitute check file in the substitute check database 108.

In step 735, the check presentment module 118 determines whether to select another check for presentment to the receiving institution 125. For example, steps 705-733 can be repeated for each check associated with a particular receiving institution 125, whereby the associated checks can be presented to the receiving institution 125 at the same time. If another check is to be selected for presentment, the method 460 branches back to step 705 to repeat steps 705-733 for another check. If not, the method 460 branches to step 740.

In step 740, the check presentment module 116 creates an electronic ICL file comprising the substitute check file for each selected check. The ICL file can further comprise a series of addenda and records related to the selected check(s). For example, the ICL file can comprise an addendum comprising information about a bank of first deposit. In addition, for each bundle of substitute checks in the ICL, the ICL can include a bundle summary control record comprising information about the bundle. For example, the bundle summary control record can comprise a bundle identification number, the number of items (substitute check files) in the bundle, the value of each of the items in the bundle, and the total value of all the items in the bundle. The ICL file also can comprise a cover page control record comprising information about the origin and destination of the ICL file, and a cash letter bundle summary control record comprising a summary of all bundle summary control records in the ICL file.

To create the ICL file in an exemplary embodiment, the check presentment module 116 can organize the substitute check files (or items) into at least one bundle. Each bundle can comprise information regarding one or more substitute checks. The check presentment module 116 can read information regarding the substitute checks from the financial data files, addenda data files, image files, and/or substitute check files corresponding to the substitute checks. Then, the check presentment module 116 can store certain of the read information into appropriate record fields of the ICL file.

The check presentment module 116 also can generate and enter into appropriate fields of the ICL file information regarding the bundle(s). For example, for each bundle, the check presentment module 116 can add up the total number of items in the bundle and the total value of all items in the bundle and can store the total number of items, the total value of all items, and the value of each item in the bundle summary control record corresponding to the bundle. Similarly, the check presentment module 116 can add up the total value of all the items in all of the substitute check bundles (or the total value of all bundles) and can store the total value amount in the cash letter bundle summary control record of the ICL file.

In step 745, the check presentment module 116 determines whether to present the ICL electronically or via paper. If the ICL is to be presented electronically, the method 460 branches to step 775. In step 775, the check presentment module 116 electronically transmits the ICL file to an RI computer 126 of the receiving institution 125, e.g., via a network (not shown).

If the check presentment module 116 determines in step 745 to present the ICL via paper, the method 460 branches to step 747. In step 747, the check presentment module 116 generates a print stream by which the ICL can be printed onto paper. Step 747 is described in more detail below with reference to FIG. 8.

In step 750, the check presentment module 116 determines whether to print the ICL locally or remotely. If the ICL is to be printed locally, the method 460 branches to step 755. In step 755, the check presentment module 116 prints the ICL via a printer 117. The check presentment module 116 prints the ICL using the print stream generated in step 747. In step 760, an operator of the check processing site 105 collects the printed ICL, including the paper substitute check(s), for delivery to the receiving institution 125. For example, the operator can mail or courier the printed ICL to the receiving institution 125.

If the check presentment module 116 determines in step 750 to print the ICL remotely, the method 460 branches to step 770. In step 770, the check presentment module 116 transmits the print stream generated in step 747 to the receiving institution 125, e.g., via a network (not shown). In step 773, the receiving institution 125 prints the ICL, including the paper substitute check(s), on the RI printer 127.

In an alternative embodiment of the invention, the check presentment module 116 can generate an ICL print stream (as in step 747 described below with reference to FIG. 8) without first generating an ICL file or a substitute check file. The check presentment module 116 can collect data directly from the image file database 113, the financial data file database 114, and/or the addenda data file database 112 for creation of the print stream. The check presentment module 116 can store the collected data in pre-defined fields of a print stream file and transmit the print stream file to the printer 117 or the RI printer 127 for printing.

Figure 8:
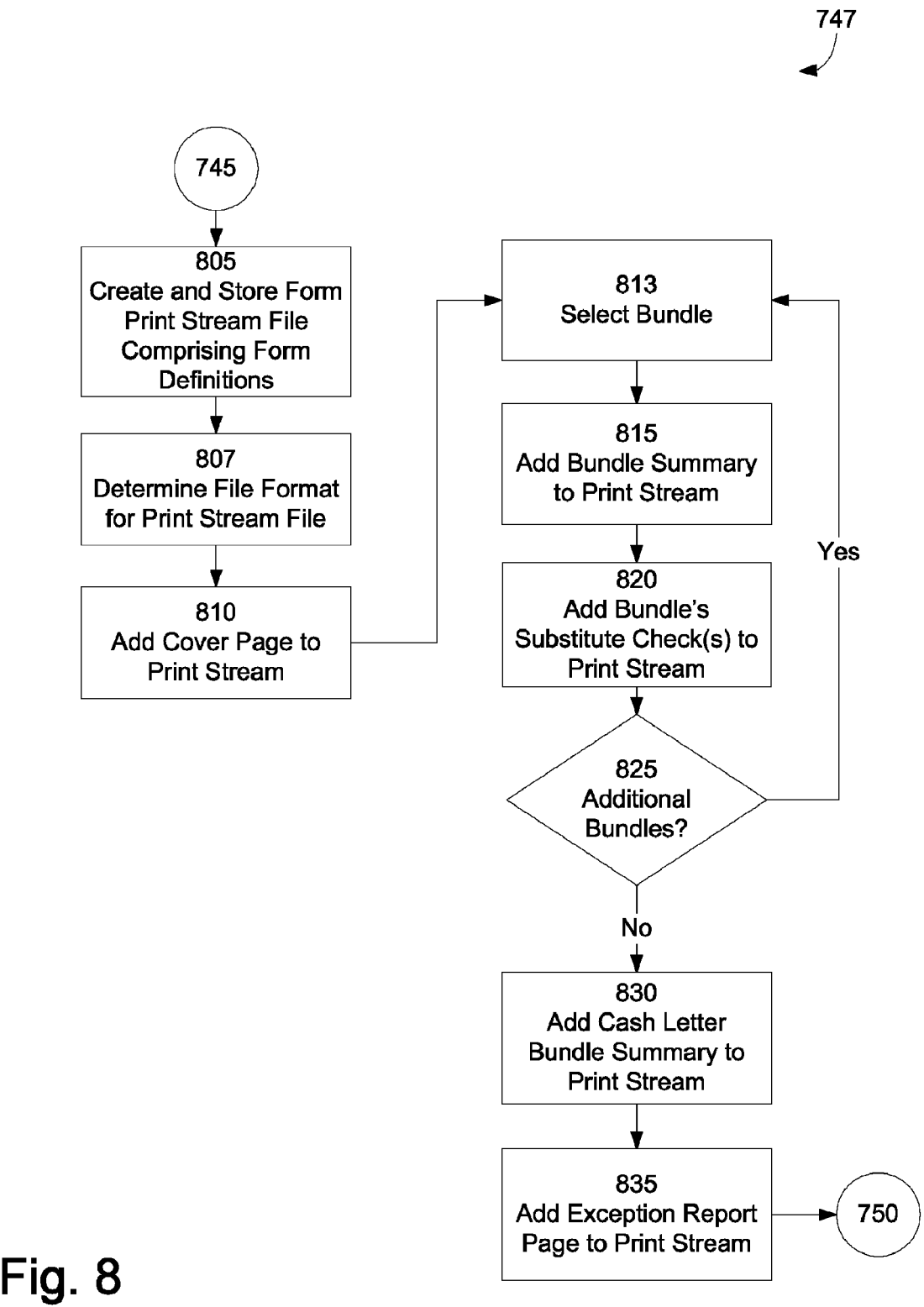
FIG. 8 is a flow chart depicting a method for generating a cash letter print stream, according to an exemplary embodiment of the invention.

FIG. 8 is a flow chart depicting a method 747 for generating a cash letter print stream according to an exemplary embodiment of the invention, as referred to in step 747 of FIG. 7. The exemplary method 747 is merely illustrative and, in alternative embodiments of the invention, certain steps can be performed in a different order, performed in parallel with one another, or omitted entirely, and/or certain additional steps can be performed without departing from the scope and spirit of the invention. The method 747 is described below with reference to FIGS. 1 and 8.

In step 805, a form print stream file is created and stored. The form print stream file comprises electronic form definitions for each cash letter document to be printed in the cash letter. The cash letter documents include a cover page, a bundle summary, substitute checks, a cash letter bundle summary, and an exception report page. The form definitions determine how and where to include information in the print stream for each cash letter document. For example, the form print stream file can comprise a form definition for the print stream for each of the cover page, the bundle summary, the substitute checks, the cash letter bundle summary, and the exception report page. Each form definition defines data fields and their page locations, which each correspond to the information and format required for a paper cash letter. Based on the form definitions, the check presentment module 116 can retrieve and input the proper information (data and/or images) into the data fields to create the print stream. The check presentment module 116 stores the form print stream file in a form database 130.

In step 807, the check presentment module 116 determines the file format in which to generate the print stream. The print stream file format can vary depending on the person or entity printing the cash letter. For example, the file format can vary depending on the printing person/entity's file format capabilities. A cover page control record of the ICL file generated in step 740 (FIG. 7) can comprise information regarding the printing person or entity and/or the person/entity's file format capabilities. For example, if the cover page control record indicates that the cash letter will be printed by a Federal Reserve Bank, the print stream can be in a AFP file format. Alternative suitable file formats, including the .PDF format, will be apparent to a person of skill in the art.

In steps 810-830, the check presentment module 116 creates the cash letter print stream in the appropriate file format.

In step 810, the check presentment module 116 adds a cover page to the print stream. The cover page comprises information about the cash letter's contents, such as the number of substitute checks in the cash letter, information identifying the transmitting bank, and/or information identifying the receiving institution 125. For example, the cover page information can comprise information identifying the bank receiving the cash letter by American Bankers Association ("ABA") number, name, and address. It can further comprise print dispatch information, such as the bin, section, and/or courier assigned to the cash letter. To add the cover page to the print stream, the check presentment module 116 inserts information contained within the ICL file into fields of one or more of the form definitions created in step 805. For example, the check presentment module 116 can insert information contained within the ICL's cover page control record into corresponding fields of a cover page form definition.

In step 813, the check presentment module 116 selects a bundle comprising at least one substitute check for inclusion in the print stream. In step 815, the check presentment module 116 adds a bundle summary to the print stream. The bundle summary comprises information regarding the bundle selected in step 813. For example, the bundle summary can comprise the number of substitute checks in the bundle, the value of each of the substitute checks in the bundle, and the total value of all substitute checks in the bundle. To add the bundle summary to the print stream, the check presentment module 116 inserts information contained within the ICL file into fields of one or more of the form definitions created in step 805. For example, the check presentment module 116 can insert information contained within the ICL's bundle summary control record into corresponding fields of a bundle summary form definition.

In step 820, the check presentment module 116 adds the bundle's substitute check(s) to the print stream. To add the substitute check(s) to the print stream, the check presentment module 116 inserts information contained within the ICL file into fields of one or more of the form definitions created in step 805. For example, for each substitute check, the check presentment module 116 can insert the financial data, addenda data, and/or the electronic image(s) corresponding to the substitute check (and/or stored in the substitute check file) into corresponding fields of a substitute check form definition. Upon printing the generated print stream, each substitute check will include all of the original MICR data of the corresponding original paper check and all endorsements. For example, each substitute check can comply with the American National Standards Institute Specifications for an Image Replacement Document (ANSI X9.100-140, X9.90), or other appropriate industry standards, as may change from time to time.

In step 825, the check presentment module 116 determines whether to select another bundle for inclusion in the print stream. For example, steps 813-820 can be repeated for each bundle to be included in the cash letter print stream. If the check presentment module 116 determines to select another bundle, the method 747 branches back to step 813 to repeat steps 813-820 for another bundle. If the check presentment module 116 determines in step 825 not to select another bundle, the method 747 branches to step 830 to complete creation of the print stream.

In step 830, the check presentment module 116 adds a cash letter bundle summary to the print stream. The cash letter bundle summary comprises information about all of the bundles in the cash letter. For example, the cash letter bundle summary can comprise a total of the value of all the bundles in the cash letter. To add the cash letter bundle summary to the print stream, the check presentment module 116 inserts information contained within the ICL file into fields of one or more of the form definitions created in step 805. For example, the check presentment module 116 can insert information from the cash letter bundle summary control record into corresponding fields of a cash letter bundle summary form definition.

In step 835, the check presentment module 116 adds an exception report page to the print stream. The exception report page comprises information regarding any errors the check presentment module 116 incurred when adding other documents to the print stream file. For example, the exception report information can identify a substitute check for which the check presentment module 116 was unable to input corresponding substitute check information into the substitute check form definition. To add the exception report page to the print stream, the check presentment module 116 inserts information contained within the ICL file into fields of one or more of the form definitions created in step 805. For example, the check presentment module 116 can insert information regarding or identifying the errors into corresponding fields of an exception report page form definition.

The method 747 continues to step 750 (FIG. 7).

As set forth above, in alternative exemplary embodiments of the invention, the depositing institution 103 can generate an ICL for received checks or forward received paper checks to the capture site 104. In such embodiments, the depositing institution 103 or the capture site 104 can perform certain of the method steps described above with reference to FIGS. 4-7. For example, if the depositing institution 103 generates an ICL for received checks, the depositing institution 103 can capture, generate, and store electronic check images and financial data, as set forth in exemplary steps 405-445 of FIGS. 4, 5A, and 5B. In addition, the reject/repair module 213 of the depositing institution 103 can perform reject/repair functions on the captured financial data, as set forth in the exemplary method 450 of FIGS. 4, 6A, and 6B. The ICL Module 215 of the depositing institution 103 can generate an ICL comprising the captured electronic check images and financial data and can forward the generated ICL to the check processing site 105, which can process the ICL in accordance with certain of the remaining exemplary steps of FIGS. 4, 7, and 8.

Figure 9:
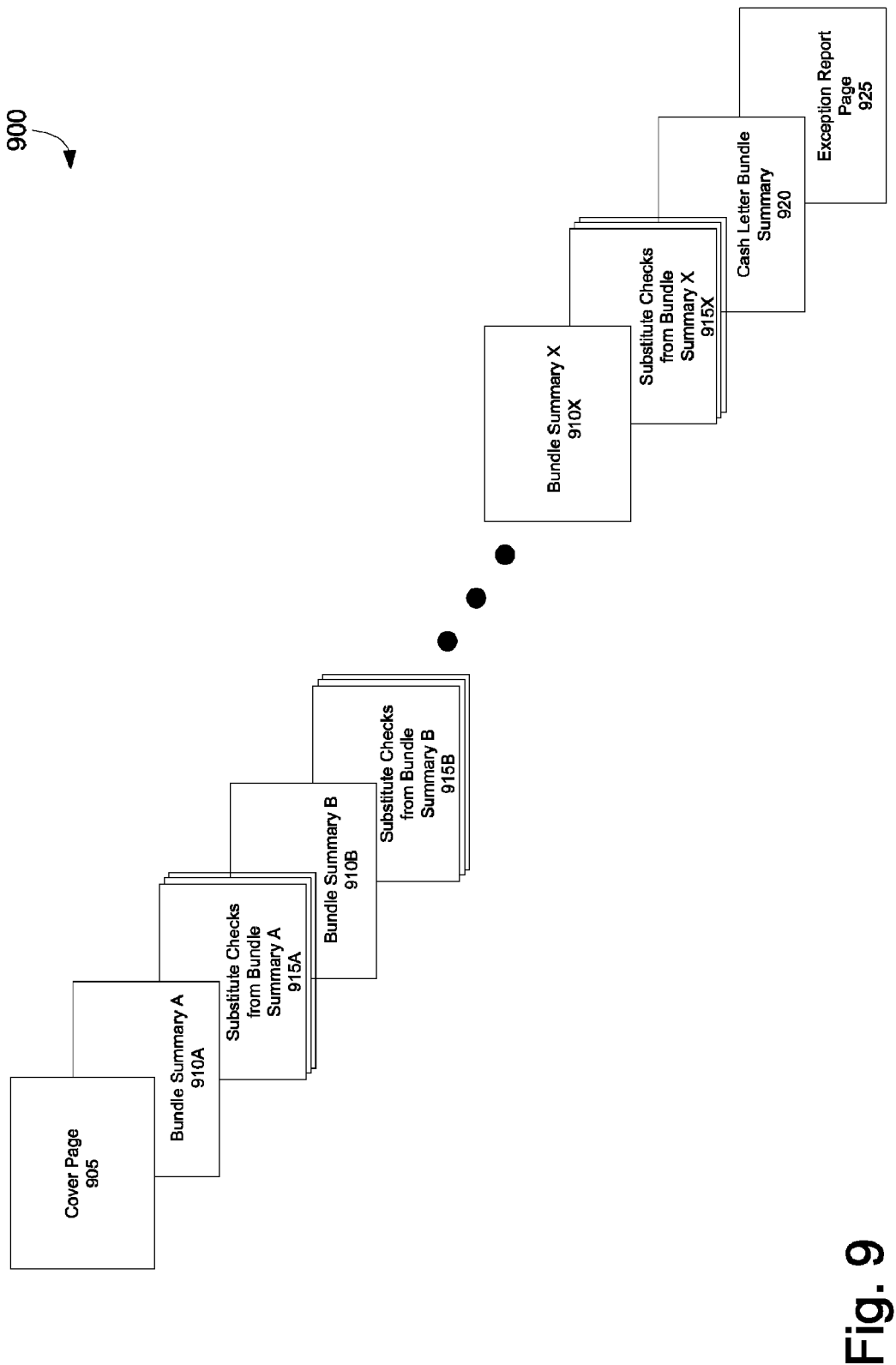
FIG. 9 is a block diagram depicting a print stream generated in accordance with an exemplary embodiment of the invention.

FIG. 9 is a block diagram depicting a print stream 900 generated in accordance with an exemplary embodiment of the invention. First in the print stream 900 is the cover page 905. The cover page 905 comprises information regarding the cash letter's contents, such as the number of substitute checks in the cash letter, information identifying the transmitting bank, and/or information identifying the receiving institution 125. For example, the cover page can comprise information identifying the bank receiving the cash letter by ABA number, name, and address. It can further comprise print dispatch information, such as the bin, section, and/or courier assigned to the cash letter.

Second in the print stream is the bundle summary 910A for the first bundle in the cash letter. The bundle summary 910A comprises information regarding the contents of the first bundle. For example, the bundle summary 910A can comprise the number of substitute checks in the bundle, the value of each of the substitute checks in the bundle, and the total value of all substitute checks in the bundle. For each bundle of substitute checks in the print stream, there is a corresponding bundle summary 910A, 910B, 910X.

After each respective bundle summary 910A, 910B, 910X in the print stream are the substitute checks 915A, 915B, 915X listed in the corresponding bundle summary 910A, 910B, 910X. Each substitute check can comprise all of the original MICR data of the corresponding original paper check and all endorsements.

Next in the print stream 900 is the cash letter bundle summary 920. The cash letter bundle summary 920 comprises information about all of the bundles in the cash letter. For example, the cash letter bundle summary 920 can comprise a total of the value of all the bundles in the cash letter.

Last in the print stream 900 is the exception report page 925, which comprises information regarding any errors the check presentment module 116 incurred when generating other documents in the print stream file. For example, the exception report page 925 can comprise information identifying a substitute check for which the check presentment module 116 was unable to input corresponding substitute check information into the substitute check form definition.

The information from the print stream 900 can be printed in order, with the resulting printout comprising a paper cash letter. For example, printing the information from the print stream 900 depicted in FIG. 9, results in a properly formatted and ordered paper cash letter comprising substitute checks and audit data. The audit data (i.e., the cover page 905, the bundle summary 910A, 910B, 910X, the cash letter bundle summary 920, and the exception report page 925) comprises control reports that detail the documents printed concurrently therewith. Thus, the audit data provides a real-time inventory of the paper cash letter.

In an exemplary embodiment, the print stream 900 can be printed on perforated paper and passed through a bursting machine to create the paper cash letter. Upon printing, a paper burster can separate each printed page at its perforations, so that each separated page comprises a portion of the cash letter. Thus, the cover page 905, bundle summaries 910A, 910B, 910X, substitute checks 915A, 915B, 915×, cash letter bundle summary 920, and exception report page 925 can each be printed on a separate page based on the size of the pages between the perforations. Additionally, the different components of the paper cash letter can be printed on different color paper for easy identification.

In one embodiment of the invention, the check presentment module 116 can instruct the printer 117 (or the RI printer 127) to print each of the documents on different types, colors, and/or sizes of paper. For example, the check presentment module 116 can instruct the printer 117 (or the RI printer 127) to print the substitute checks 915A, 915B, 915X on yellow paper and each of the other documents in the cash letter on blue paper. In yet another embodiment of the invention, the type, color, and/or size of the paper can vary depending on whether the transaction is a forward transaction or a return transaction. For example, the check presentment module 116 can instruct the printer 117 (or the RI printer 127) to print each of the non-substitute check documents of a forward transaction on blue paper and each of the non-substitute check documents of a return transaction on red paper. In an exemplary embodiment, the print stream file form definition corresponding to each cash letter document can comprise a designation for a particular type, color, and/or size of paper on which to print the corresponding cash letter document.

FIG. 10 is a block diagram depicting a cover page 1000 printed from a print stream generated in accordance with an exemplary embodiment of the invention. The cover page 1000 is printed on one section of a perforated sheet of paper and comprises information regarding the cash letter's contents. The cover page 1000 can be separated from the other sections of the perforated sheet by tearing the sheet at its perforations. The exemplary cover page 1000 comprises a count 1005 of the number of items in the cash letter and destination information 1010 identifying the destination of the cash letter by ABA number, name, and address. It further comprises print dispatch information, such as the bin, section, and/or courier assigned to the cash letter. A person of skill in the art will recognize that the cover page 1000 can comprise other additional information related to the cash letter's contents, and/or certain illustrated information can be removed from the cover page 1000, without departing from the scope and spirit of the invention.

FIG. 11 is a block diagram depicting a bundle summary page 1100 printed from a print stream generated in accordance with an exemplary embodiment of the invention. The bundle summary page 1100 is printed on three sections of a perforated sheet of paper. The sections of the bundle summary page 1100 can be separated from one another by tearing the sheet at its perforations. The exemplary bundle summary page 1100 comprises a count 1105 of the number of items in bundle A, the value of each of the items in the bundle, and the total value 1110 of all items in the bundle. It also includes information identifying the destination of the bundle summary page 1100 by bank name and address. A person of skill in the art will recognize that the bundle summary page 1100 can comprise other additional information related to the items in bundle A, and/or certain illustrated information can be removed from the bundle summary page 1100, without departing from the scope and spirit of the invention.

Figure 12:
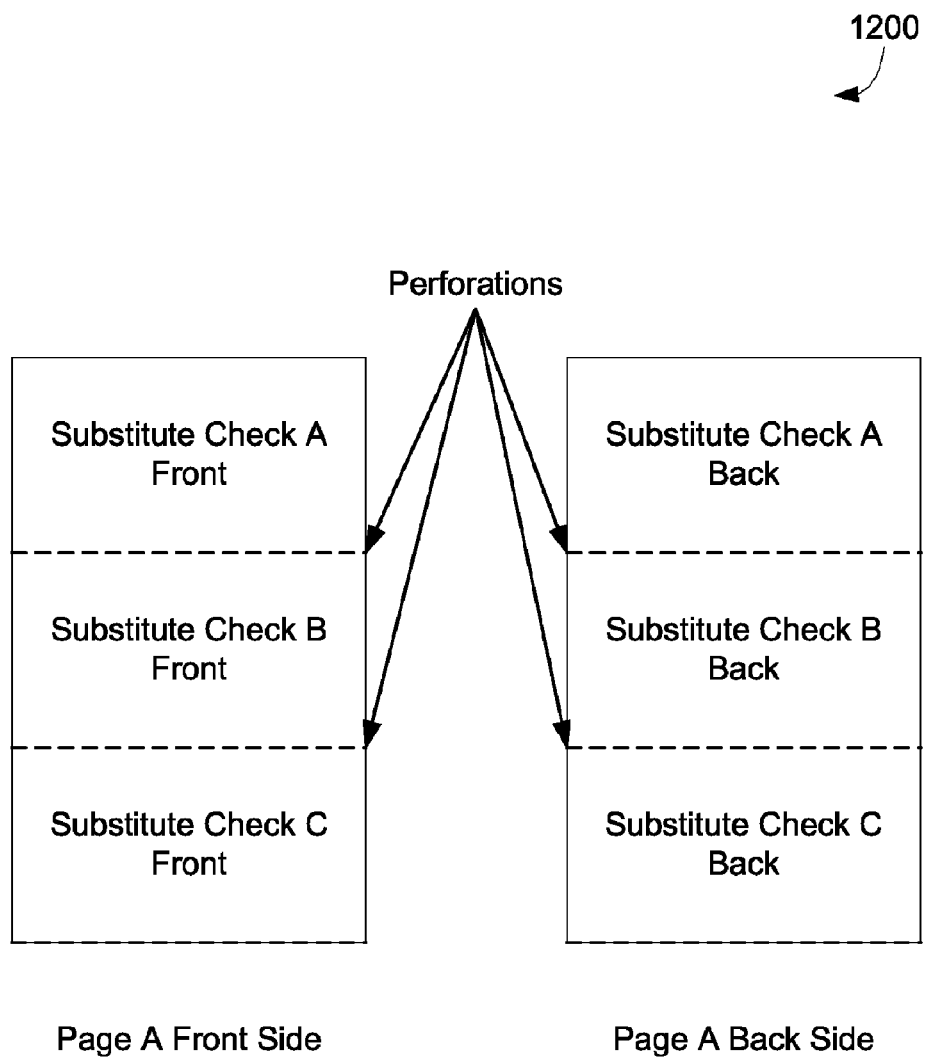
FIG. 12 is a block diagram depicting a substitute check page printed from a print stream generated in accordance with an exemplary embodiment of the invention.

FIG. 12 is a block diagram depicting a substitute check page 1200 printed from a print stream generated in accordance with an exemplary embodiment of the invention. The substitute check page 1200 comprises multiple substitute checks, printed front and back, on perforated paper. As shown in FIG. 12, three substitute checks can be printed on a single piece of perforated paper, which can be separated at its perforations to produce individual pages for each substitute check.

FIG. 13 is a block diagram depicting a cash letter bundle summary page 1300 printed from a print stream generated in accordance with an exemplary embodiment of the invention. The cash letter bundle summary page 1300 is printed on three sections of a perforated sheet of paper. The sections of the cash letter bundle summary page 1300 can be separated from one another by tearing the sheet at its perforations. The exemplary cash letter bundle summary page 1300 comprises information regarding each bundle in the cash letter, including a bundle ID, bundle number, item count, and total value amount for each bundle in the cash letter. The cash letter bundle summary page 1300 comprises a total item count 1305 and a total value amount for all the bundles 1310. In addition, the cash letter bundle summary page 1300 comprises information identifying the destination of the cash letter bundle summary page 1300 by bank ABA number, name, and address. A person of skill in the art will recognize that the cash letter bundle summary page 1300 can comprise other additional information related to the cash letter bundles, and/or certain illustrated information can be removed from the cash letter bundle summary page 1300, without departing from the scope and spirit of the invention.

FIG. 14 is a block diagram depicting an exception report page 1400 printed from a print stream generated in accordance with an exemplary embodiment of the invention. The exception report page 1400 is printed on one section of a perforated sheet of paper. The exception report page 1400 can be separated from the other sections of the perforated sheet by tearing the sheet at its perforations. The exemplary exception report page 1400 comprises information regarding errors the check presentment module incurred when generating other documents in the print stream file. The errors relate to three documents, which are identified by routing transit number, sequence number, amount, and bundle ID. In addition, a reason for each error is provided. A person of skill in the art will recognize that the exception report page 1400 can comprise other additional information related to the errors, and/or certain illustrated information can be removed from the exception report page 1400, without departing from the scope and spirit of the invention.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

We claim:

1. A computer-implemented method for creating an expanded mass data set of a financial data file to process a check for payment, comprising the steps of:
 identifying via a data capture module financial data related to the check, the financial data comprising "on us" data and "auxiliary on us" data;
 storing, by the data capture module, the "on us" data in a first field of a financial data file;
 storing, by the data capture module, the "auxiliary on us" data in a second field of the financial data file;
 truncating, by the data capture module, the "auxiliary on us" data;
 storing, by the data capture module, the truncated "auxiliary on us" data in a third field of the financial data file; and
 creating, by a presentment module, a substitute check comprising at least certain of the data in the financial data file,
 wherein each of the data capture module and the presentment module is implemented in a computer system that comprises instructions stored in a machine-readable medium and a processor that executes the instructions.

2. The computer-implemented method according to claim 1, wherein the step of identifying the financial data comprises reading MICR data from the check, and
 wherein the "on us" data comprises at least a portion of the MICR data.

3. The computer-implemented method according to claim 1, wherein the "on us" data comprises process control data, and
 wherein the method further comprises the steps of:
 truncating, by the data capture module, the "on us" data; and
 storing, by the data capture module, the truncated "on us" data in a fourth field of the financial data file.

4. The computer-implemented method according to claim 1, wherein the "on us" data comprises account number data, and
 wherein the method further comprises the steps of:
 truncating, by the data capture module, the "on us" data; and
 storing, by the data capture module, the truncated "on us" data in a fourth field of the financial data file.

5. The computer-implemented method according to claim 1, wherein the "on us" data comprises check number data, and
 wherein the method further comprises the steps of:
 truncating, by the data capture module, the "on us" data; and
 storing, by the data capture module, the truncated "on us" data in a fourth field of the financial data file.

6. The computer-implemented method according to claim 1, further comprising the steps of:
 capturing an electronic image of the check; and
 associating, by the data capture module, the electronic image with the financial data file.

7. The computer-implemented method according to claim 6, wherein the step of associating the electronic image with the financial data file comprises the step of assigning a common file name to the electronic image and the financial data file.

8. The computer-implemented method according to claim 6, wherein the financial data further comprises amount data and routing transit number data, and
wherein the method further comprises the steps of:
storing, by the data capture module, the amount data in a fourth field of the financial data file; and
storing, by the data capture module, the routing transit number data in a fifth field of the financial data file.

9. The computer-implemented method according to claim 8, wherein the financial data further comprises an external processing code, and
wherein the method further comprises the step of storing, by the data capture module, the external processing code in a sixth field of the financial data file.

10. The computer-implemented method according to claim 8, wherein the substitute check comprises the "on us" data in the first field of the financial data file, the "auxiliary on us" data in the second field of the financial data file, the electronic image, the amount data in the fourth field of the financial data file, and the routing transit number data in the fifth field of the financial data file.

11. The computer-implemented method according to claim 10, further comprising the step of storing, by the data capture module, addenda data related to the check, and
wherein the substitute check comprises the addenda data.

12. The computer-implemented method according to claim 8, further comprising the step of creating, by the presentment module, an image cash letter comprising the "on us" data in the first field of the financial data file, the "auxiliary on us" data in the second field of the financial data file, the electronic image, the amount data in the fourth field of the financial data file, and the routing transit number data in the fifth field of the financial data file.

13. The computer-implemented method according to claim 1, wherein truncating comprises removing at least one of dashes and data beyond a specified number of characters.

14. A computer-readable medium having computer-executable instructions for performing the steps recited in claim 1.

15. The computer-implemented method according to claim 1, further comprising the steps of:
identifying, by the data capture module, a result of an image quality analysis performed on an electronic image of the check; and
storing, by the data capture module, the identified result in a fourth field of the financial data file.

16. A computer-implemented method for creating an expanded mass data set of a financial data file to process a check for payment, comprising the steps of:
identifying, via a data capture module, financial data related to the check, the financial data comprising "on us" data and "auxiliary on us" data;
storing, by the data capture module, the "on us" data in a first field of a financial data file;
storing, by the data capture module, the "auxiliary on us" data in a second field of the financial data file;
truncating, by the data capture module, the "on us" data;
storing, by the data capture module, the truncated "on us" data in a third field of the financial data file; and
creating, by a presentment module, a substitute check comprising at least certain of the data in the financial data file,
wherein each of the data capture module and the presentment module is implemented in a computer system that comprises instructions stored in a machine-readable medium and a processor that executes the instructions.

17. The computer-implemented method according to claim 16, wherein the step of identifying the financial data comprises reading MICR data from the check, and
wherein the financial data comprises at least a portion of the MICR data.

18. The computer-implemented method according to claim 16, wherein the "on us" data comprises at least one of process control data, account number data, and check number data.

19. The computer-implemented method according to claim 16, further comprising the steps of:
capturing an electronic image of the check; and
associating, by the data capture module, the electronic image with the financial data file.

20. The computer-implemented method according to claim 19, wherein the step of associating the electronic image with the financial data file comprises the step assigning, by the data capture module, a common file name to the electronic image and the financial data file.

21. The computer-implemented method according to claim 19, wherein the financial data further comprises amount data and routing transit number data, and
wherein the method further comprises the steps of:
storing, by the data capture module, the amount data in a fourth field of the financial data file; and
storing, by the data capture module, the routing transit number data in a fifth field of the financial data file.

22. The computer-implemented method according to claim 21, wherein the financial data further comprises an external processing code, and
wherein the method further comprises the step of storing, by the data capture module, the external processing code in a sixth field of the financial data file.

23. The computer-implemented method according to claim 21, wherein the substitute check comprises the "on us" data in the first field of the financial data file, the "auxiliary on us" data in the second field of the financial data file, the electronic image, the amount data in the fourth field of the financial data file, and the routing transit number data in the fifth field of the financial data file.

24. The computer-implemented method according to claim 23, further comprising the step of storing, by the data capture module, addenda data related to the check, and
wherein the substitute check comprises the addenda data.

25. The computer-implemented method according to claim 21, further comprising the step of creating, by the presentment module, an image cash letter comprising the "on us" data in the first field of the financial data file, the "auxiliary on us" data in the second field of the financial data file, the electronic image, the amount data in the fourth field of the financial data file, and the routing transit number data in the fifth field of the financial data file.

26. The computer-implemented method according to claim 16, wherein truncating comprises removing at least one of extraneous characters and data beyond a specified number of characters.

27. A computer-readable medium having computer-executable instructions for performing the steps recited in claim 16.

28. The computer-implemented method according to claim 16, further comprising the steps of:
identifying, by the data capture module, a result of an image quality analysis performed on an electronic image of the check; and storing, by the data capture module, the identified result in a fourth field of the financial data file.

29. A system for creating an expanded mass data set of a financial data file to process a check for payment, comprising:
   a data capture module operable to:
      identify financial data related to the check, the financial data comprising "on us" data and "auxiliary on us" data, and
      truncate the "on us" data; and
   a data storage device operable to:
      store the identified "on us" data in a first field of a financial data file,
      store the identified "auxiliary on us" data in a second field of the financial data file, and
      store the truncated "on us" data in a third field of the financial data file; and
   a presentment module that creates a substitute check comprising at least certain of the data in the financial data file.

30. The system according to claim 29, wherein the "on us" data comprises at least one of process control data, account number data, and check number data.

31. The system according to claim 29, further comprising:
   an image capturing device operable to capture an electronic image of the check; and
   wherein the data capture module is further operable to associate the electronic image with the financial data file.

32. The system according to claim 29, wherein the financial data further comprises amount data and routing transit number data, and
   wherein the data capture module is further operable to:
      store the amount data in a fourth field of the financial data file, and
      store the routing transit number data in a fifth field of the financial data file.

33. The system according to claim 29, wherein the data capture module is further operable to identify a result of an image quality analysis performed on an electronic image of the check, and
   wherein the data storage device is further operable to store the identified result in a fourth field of the financial data file.

34. The system according to claim 29, wherein the data capture module comprises at least one of a check sorter and a MICR reader.

35. A system for creating an expanded mass data set of a financial data file to process a check for payment, comprising:
   means for identifying financial data related to the check, the financial data comprising "on us" data and "auxiliary on us" data;
   means for storing the "on us" data in a first field of a financial data file;
   means for storing the "auxiliary on us" data in a second field of the financial data file;
   means for truncating the "on us" data;
   means for storing the truncated "on us" data in a third field of the financial data file; and
   means for creating a substitute check comprising at least certain of the data in the financial data file.

36. The system according to claim 35, wherein the "on us" data comprises at least one of process control data, account number data, and check number data.

37. The system according to claim 35, wherein the financial data further comprises amount data and routing transit number data, and
   wherein the system further comprises:
      means for capturing an electronic image of the check;
      means for associating the electronic image with the financial data file;
      means for storing the amount data in a fourth field of the financial data file; and
      means for storing the routing transit number data in a fifth field of the financial data file.

38. The system according to claim 37, wherein the financial data further comprises an external processing code, and
   wherein the system further comprises means for storing the external processing code in a sixth field of the financial data file.

39. The system according to claim 37, wherein the substitute check comprises the "on us" data in the first field of the financial data file, the "auxiliary on us" data in the second field of the financial data file, the electronic image, the amount data in the fourth field of the financial data file, and the routing transit number data in the fifth field of the financial data file.

40. The system according to claim 37, further comprising means for creating an image cash letter comprising the "on us" data in the first field of the financial data file, the "auxiliary on us" data in the second field of the financial data file, the electronic image, the amount data in the fourth field of the financial data file, and the routing transit number data in the fifth field of the financial data file.

41. The system according to claim 37, wherein the means for truncating includes means for removing at least one of extraneous characters and data beyond a specified number of characters.

42. A computer-implemented method for creating an expanded mass data set of a financial data file to process a check for payment, comprising the steps of:
   identifying, by a computer, financial data related to the check, the financial data comprising "on us" data and "auxiliary on us" data;
   storing, by the computer, the "on us" data in a first field of a financial data file;
   storing, by the computer, the "auxiliary on us" data in a second field of the financial data file;
   truncating, by the computer, the "auxiliary on us" data;
   storing, by the computer, the truncated "auxiliary on us" data in a third field of the financial data file; and
   creating, by the computer, a substitute check comprising at least certain of the data in the financial data file.

43. The computer-implemented method according to claim 42, wherein
   the financial data further comprises amount data and routing transit number data, and the method further comprises the steps of
   storing, by the computer, the amount data in a fourth field of the financial data file; and
   storing, by the computer, the routing transit number data in a fifth field of the financial data file.

44. The computer-implemented method according to claim 43, wherein the substitute check comprises the "on us" data in the first field of the financial data file, the "auxiliary on us" data in the second field of the financial data file, the amount data in the fourth field of the financial data file, and the routing transit number data in the fifth field of the financial data file.

45. The computer-implemented method according to claim 43, further comprising the step of creating, by the computer, an image cash letter comprising the "on us" data in the first field of the financial data file, the "auxiliary on us" data in the second field of the financial data file, the amount data in the fourth field of the financial data file, and the routing transit number data in the fifth field of the financial data file.

46. An apparatus for creating an expanded mass data set of a financial data file to process a check for payment, comprising:
 a computer processor configured to
  identify financial data related to the check, the financial data comprising "on us" data and "auxiliary on us" data, and
  truncate the "on us" data; and
 a storage device that
  stores the identified "on us" data in a first field of a financial data file,
  stores the identified "auxiliary on us" data in a second field of the financial data file, and
  stores the truncated "on us" data in a third field of the financial data file, wherein
 the computer processor is further configured to create a substitute check comprising at least certain of the data in the financial data file.

47. The apparatus according to claim 46, wherein
 the financial data further comprises amount data and routing transit number data, and the computer processor is further configured to
 store the amount data in a fourth field of the financial data file, and
 store the routing transit number data in a fifth field of the financial data file.

48. The apparatus according to claim 47, wherein the substitute check comprises the "on us" data in the first field of the financial data file, the "auxiliary on us" data in the second field of the financial data file, the amount data in the fourth field of the financial data file, and the routing transit number data in the fifth field of the financial data file.

49. The apparatus according to claim 46, wherein the computer processor is further configured to create an image cash letter comprising the "on us" data in the first field of the financial data file, the "auxiliary on us" data in the second field of the financial data file, the amount data in the fourth field of the financial data file, and the routing transit number data in the fifth field of the financial data file.

* * * * *